United States Patent
Spencer et al.

(10) Patent No.: US 9,596,603 B2
(45) Date of Patent: Mar. 14, 2017

(54) DISTRIBUTED BULK ONBOARDING PROCESS

(71) Applicant: Qualcomm Connected Experiences, Inc., San Diego, CA (US)

(72) Inventors: Brian J. Spencer, San Diego, CA (US); Wayne Lee, San Francisco, CA (US); Kenneth Swinson, San Diego, CA (US)

(73) Assignee: Qualcomm Connected Experiences, Inc., San Diego, CA (US)

( * ) Notice: Subject to any disclaimer, the term of this patent is extended or adjusted under 35 U.S.C. 154(b) by 113 days.

(21) Appl. No.: 14/812,186

(22) Filed: Jul. 29, 2015

(65) Prior Publication Data
US 2016/0037436 A1    Feb. 4, 2016

Related U.S. Application Data

(60) Provisional application No. 62/032,061, filed on Aug. 1, 2014.

(51) Int. Cl.
*H04W 12/08*    (2009.01)
*H04W 48/12*    (2009.01)
*H04W 84/12*    (2009.01)

(52) U.S. Cl.
CPC ........... *H04W 12/08* (2013.01); *H04W 48/12* (2013.01); *H04W 84/12* (2013.01)

(58) Field of Classification Search
CPC .............................. H04W 12/08; H04W 48/12
See application file for complete search history.

(56) References Cited

U.S. PATENT DOCUMENTS

| | | | |
|---|---|---|---|
| 2014/0108943 A1* | 4/2014 | Lee | G06F 3/04817 715/738 |
| 2014/0226817 A1* | 8/2014 | Von Huben | H04L 61/35 380/270 |
| 2015/0067154 A1* | 3/2015 | Ly | H04L 43/0876 709/224 |
| 2015/0334554 A1* | 11/2015 | Song | H04W 8/205 455/558 |
| 2016/0006815 A1* | 1/2016 | Dong | G06F 9/46 709/204 |
| 2016/0007288 A1* | 1/2016 | Samardzija | H04W 52/0229 370/311 |

* cited by examiner

Primary Examiner — Albert T Chou
(74) Attorney, Agent, or Firm — Neugeboren O'Dowd PC

(57) ABSTRACT

Methods and systems for the distributed bulk onboarding of devices onto a Wi-Fi network are provided. A method may comprise receiving, at an onboarding device, Wi-Fi configuration information. Then, it may comprise detecting, at the onboarding device, broadcast information from a plurality of devices that may be onboarded onto the Wi-Fi network, the broadcast information indicating that one or more of the plurality of devices is an onboarding node capable of onboarding another of the plurality of devices. The method may further comprise creating instructions indicating an order in which the plurality of devices may be onboarded, and by which of the one or more onboarding nodes each of the remaining devices of the plurality shall be onboarded, and providing the Wi-Fi configuration information and at least a portion of the instructions to at least one of the onboarding nodes.

18 Claims, 20 Drawing Sheets

DISTRIBUTED BULK ONBOARDING PROCESS

CLAIM OF PRIORITY UNDER 35 U.S.C. §119

The present Application for Patent claims priority to Provisional Application No. 62/032,061 entitled "DISTRIBUTED BULK ONBLARDING PROCESS" filed Aug. 1, 2014, and assigned to the assignee hereof and hereby expressly incorporated by reference herein.

TECHNICAL FIELD

The present invention relates to communication devices. In particular, but not by way of limitation, the present invention relates to bulk onboarding of communication devices

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter with appurtenances more convenient to control as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

Accordingly, in the near future, increasing development in IoT technologies will lead to numerous IoT devices surrounding a user at home, in vehicles, at work, and many other locations. As more and more devices become network-aware, problems that relate to configuring devices to access wireless networks will therefore become more acute. In particular, existing mechanisms to configure devices to access wireless networks tend to suffer from various drawbacks and limitations, which include a complex user experience, insufficient reliability, and security vulnerabilities, among other things. For example, configuring devices to access infrastructure-mode Wi-Fi networks and other similar wireless networks typically requires association and authentication of the device.

In certain cases, a process called "onboarding" may be used to accomplish the secure admission to the wireless network, wherein onboarding may allow thin client devices, headless devices, and other devices that may presumably lack a friendly user interface to learn sufficient information about the destination wireless network to accomplish the admission and authentication processes required to join the wireless network. However, if many devices need to be onboarded (e.g., 100 devices), the process of connecting to each device, and have a Wi-Fi network connect, disconnect, and validate the devices is, at the very least, cumbersome.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

SUMMARY

Figure 1A:
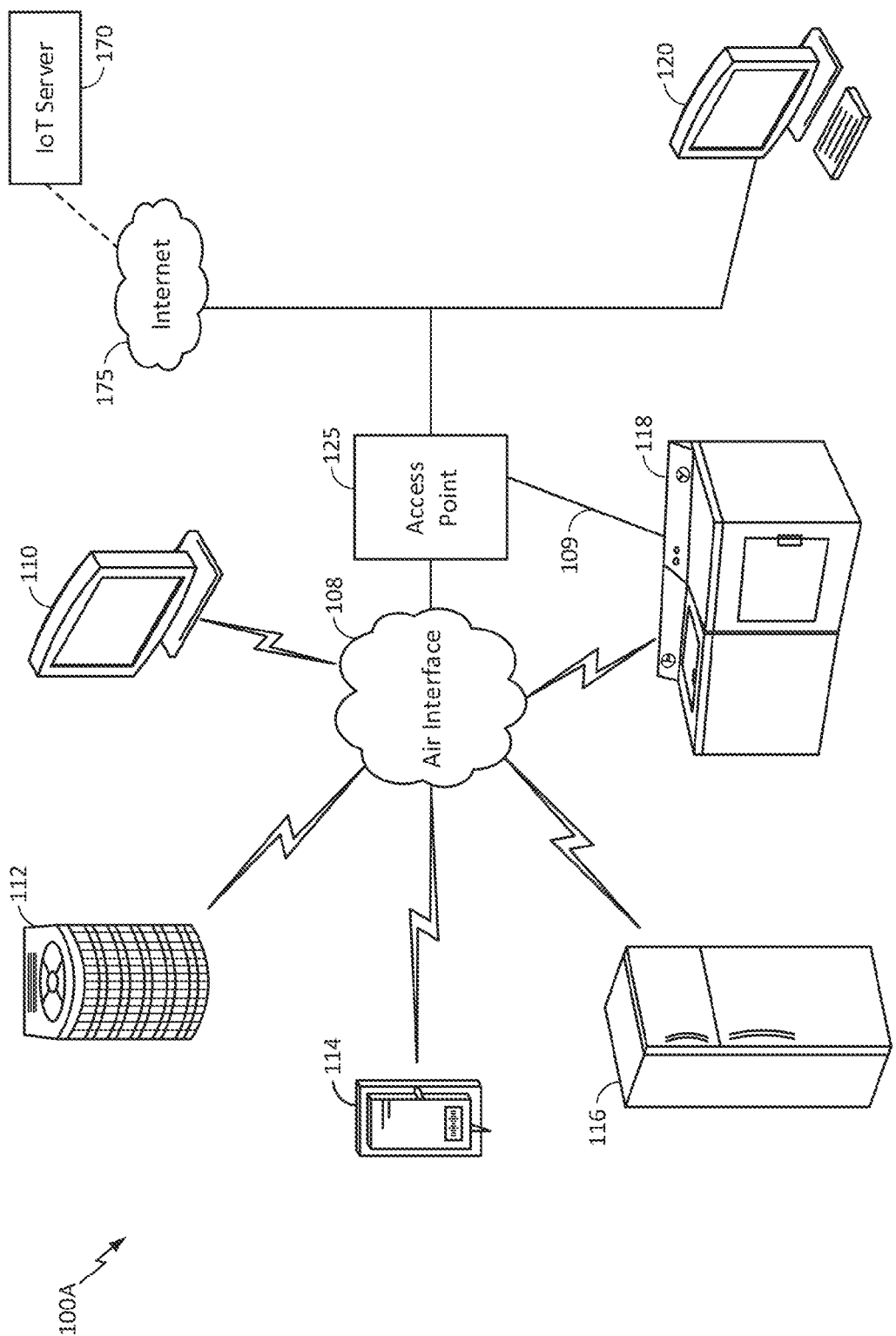
FIG. 1A illustrates a high-level system architecture of a wireless communications system in accordance with an aspect of the disclosure.

An aspect of the present disclosure provide a method for the distributed bulk onboarding of devices onto a Wi-Fi network. The method may comprise receiving, at an onboarding device, Wi-Fi configuration information. Then, it may comprise detecting, at the onboarding device, broadcast information from a plurality of devices that may be onboarded onto the Wi-Fi network, the broadcast information indicating that one or more of the plurality of devices is an onboarding node capable of onboarding another of the plurality of devices. The method may further comprise creating instructions indicating an order in which the plurality of devices may be onboarded, and by which of the one or more onboarding nodes each of the remaining devices of the plurality shall be onboarded, and providing the Wi-Fi configuration information and at least a portion of the instructions to at least one of the onboarding nodes to enable onboarding at least one device of the plurality of devices.

Another aspect of the disclosure provides a system for distributed bulk onboarding of a plurality of communication devices onto a Wi-Fi network. The system may comprise three or more communication devices. A first one of the communication devices may be a bulk onboarding configuration device and at least one second one of the other communication devices may be an onboarding node capable of onboarding at least a third one of the communication devices. In the system, the bulk onboarding communication device may be adapted to receive Wi-Fi configuration information, detect broadcast information from the plurality of communication devices that can be onboarded onto the Wi-Fi network, and create instructions that indicate the order in which the plurality of communication devices should be onboarded; In the system, the onboarding node may be adapted to receive the Wi-Fi configuration information from the bulk onboarding communication device, connect to the Wi-Fi network, and receive at least a portion of the instructions. The portion of the instructions may instruct the onboarding node to provide the Wi-Fi configuration information to the third communication device. Also within the system, the third communication device may be adapted to receive the Wi-Fi configuration information and connect to the Wi-Fi network using the configuration information.

Yet another aspect of the disclosure provides a non-transitory, tangible processor readable storage medium, encoded with processor readable instructions to perform a method for the distributed bulk onboarding of devices onto a Wi-Fi network. The method may comprise receiving, at an onboarding device, Wi-Fi configuration information. Then, it may comprise detecting, at the onboarding device, broadcast information from a plurality of devices that may be onboarded onto the Wi-Fi network, the broadcast information indicating that one or more of the plurality of devices is an onboarding node capable of onboarding another of the plurality of devices. The method may further comprise creating instructions indicating an order in which the plurality of devices may be onboarded, and by which of the one or more onboarding nodes each of the remaining devices of the plurality shall be onboarded, and providing the Wi-Fi configuration information and at least a portion of the instructions to at least one of the onboarding nodes to enable onboarding at least one device of the plurality of devices.

DETAILED DESCRIPTION

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

Certain embodiments of the present disclosure may refer to a distributed bulk onboarding process for either a secure Wi-Fi network or alternatively, a local ad-hoc network.

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
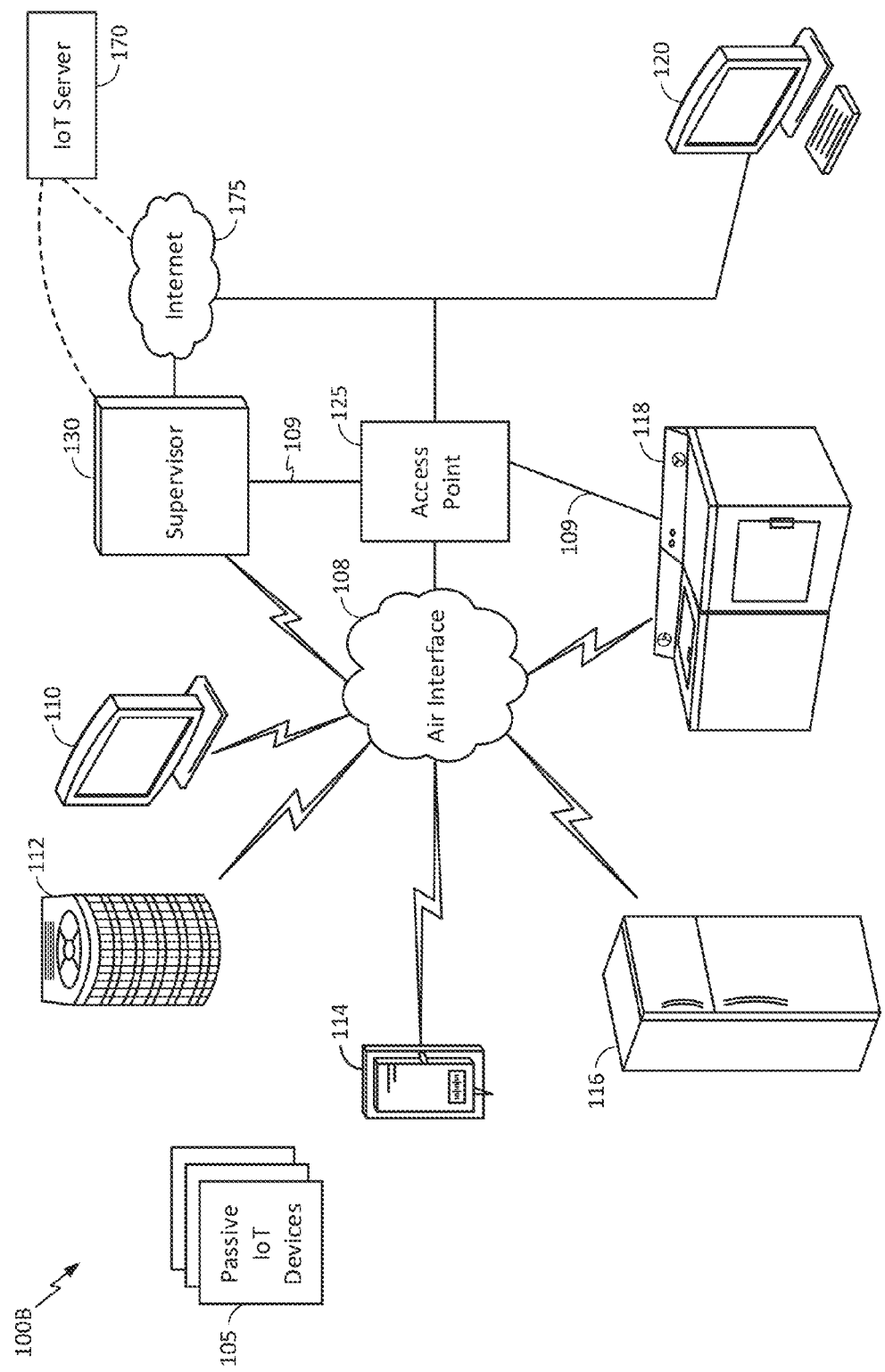
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
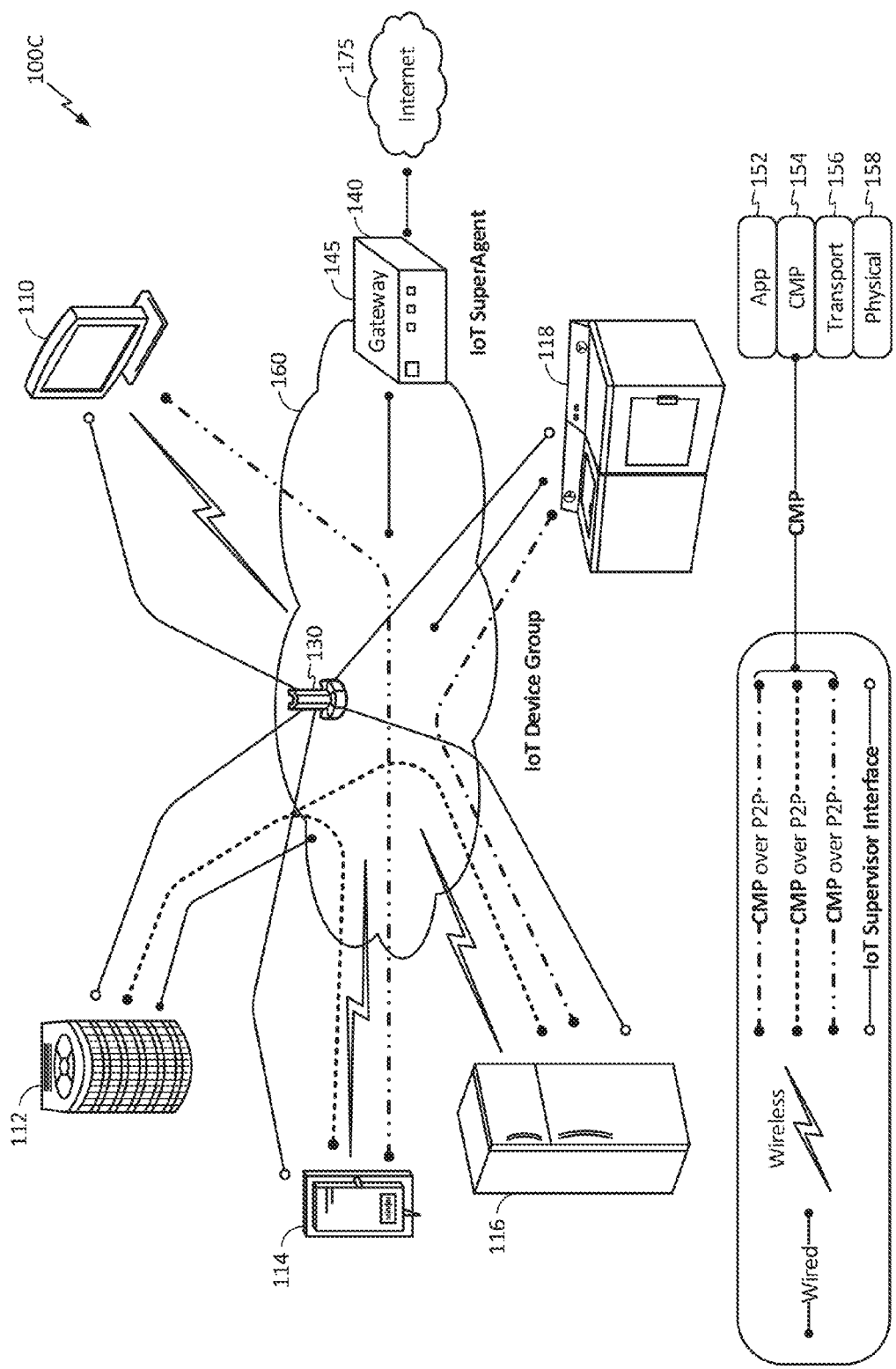
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peerto-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
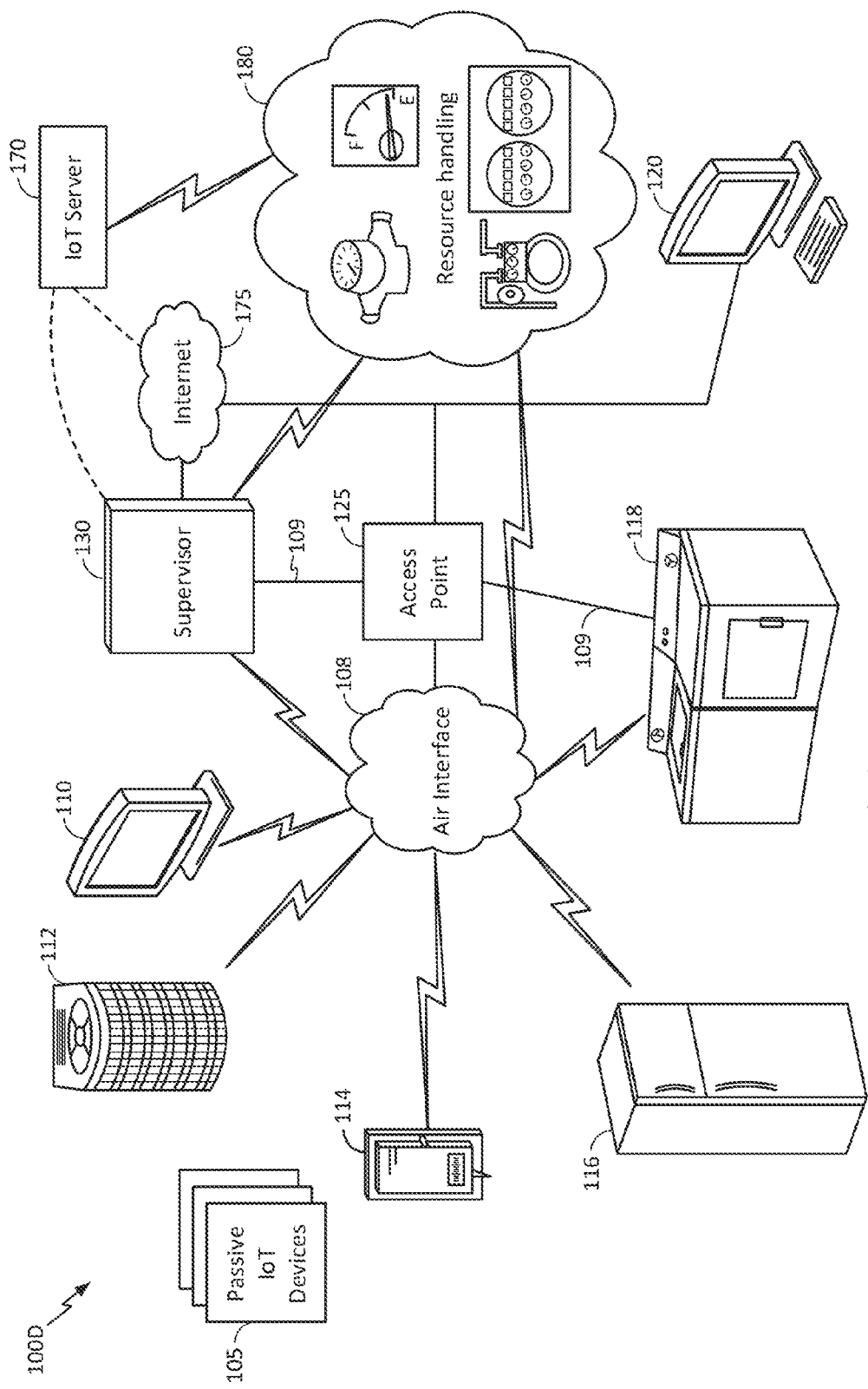
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
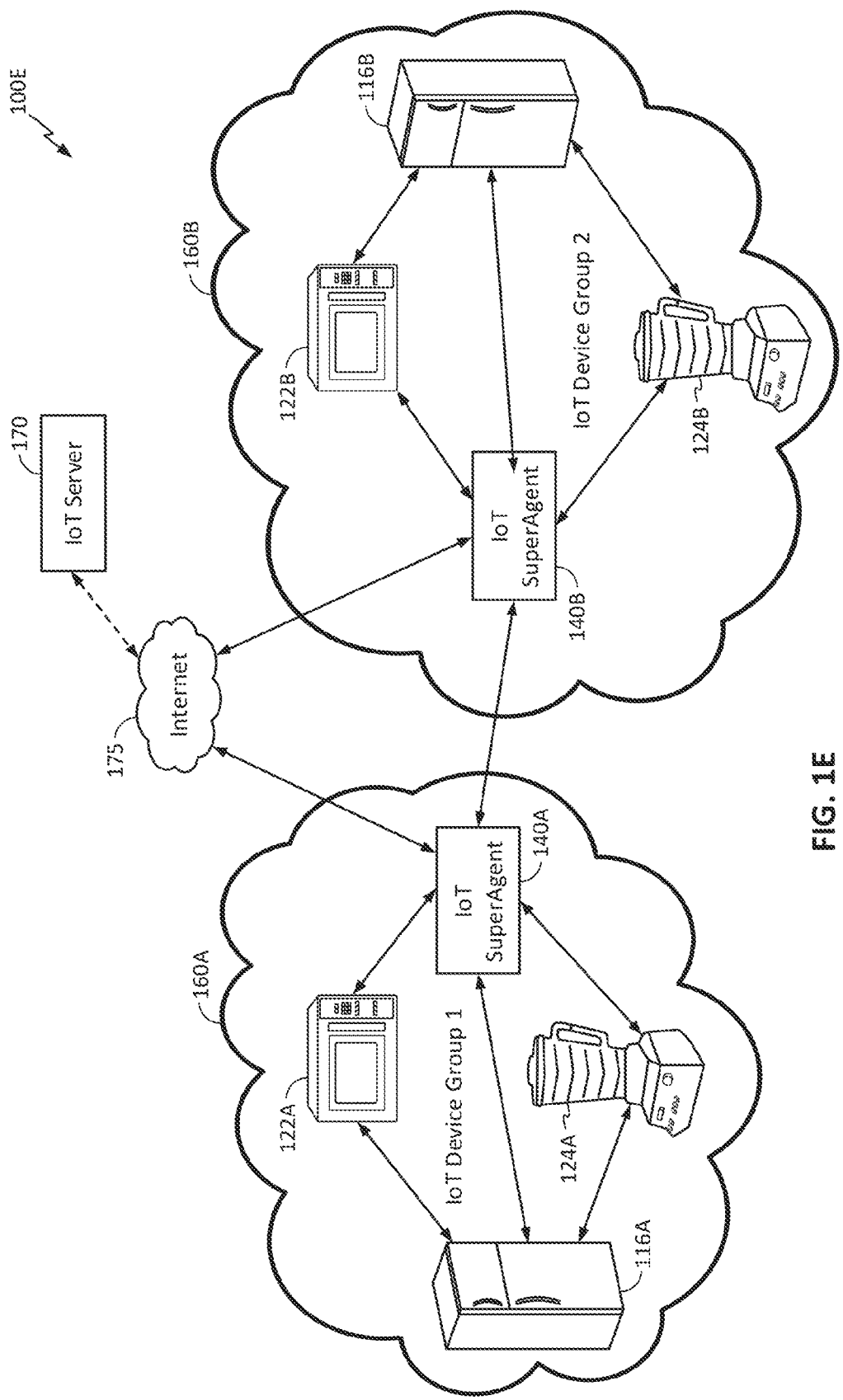
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2:
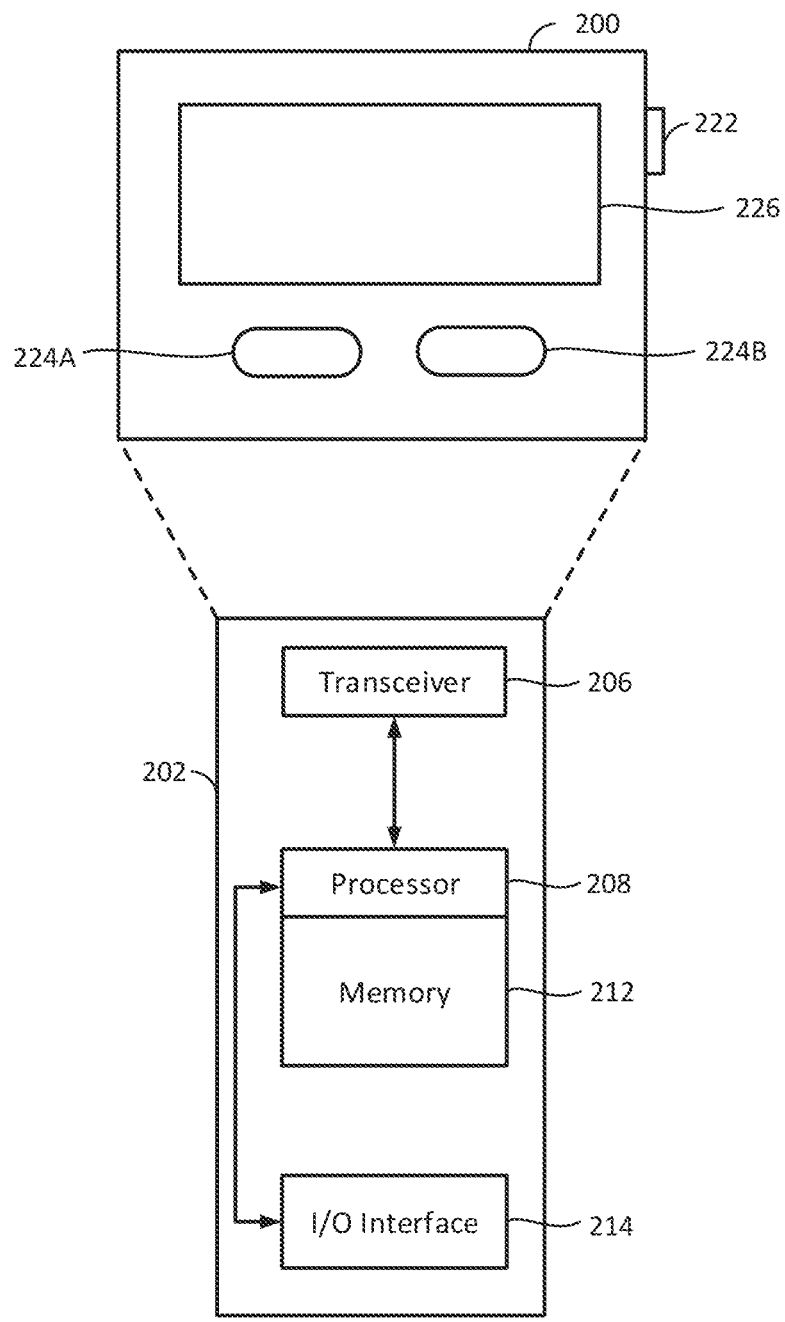
FIG. 2 illustrates an exemplary Internet of Things (IoT) device in accordance with aspects of the disclosure.

FIG. 2 illustrates a high-level example of an IoT device 200 in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2, in an example configuration for the IoT device 200, an external casing of IoT device 200 may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200, the IoT device 200 may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200, can be embodied with different hardware configurations, a basic high-level configuration for internal hardware components is shown as platform 202 in FIG. 2. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200.

Accordingly, an aspect of the disclosure can include an IoT device (e.g., IoT device 200) including the ability to perform the functions described herein. For example, the processor 208, in conjunction with the transceiver 206 may broadcast a software-enabled access point, or a "SoftAP," which is an interface that may allow the onboarding of other devices onto a Wi-Fi network. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200 in FIG. 2 are to be considered merely illustrative and the disclosure is not limited to the illustrated features or arrangement.

Figure 3:
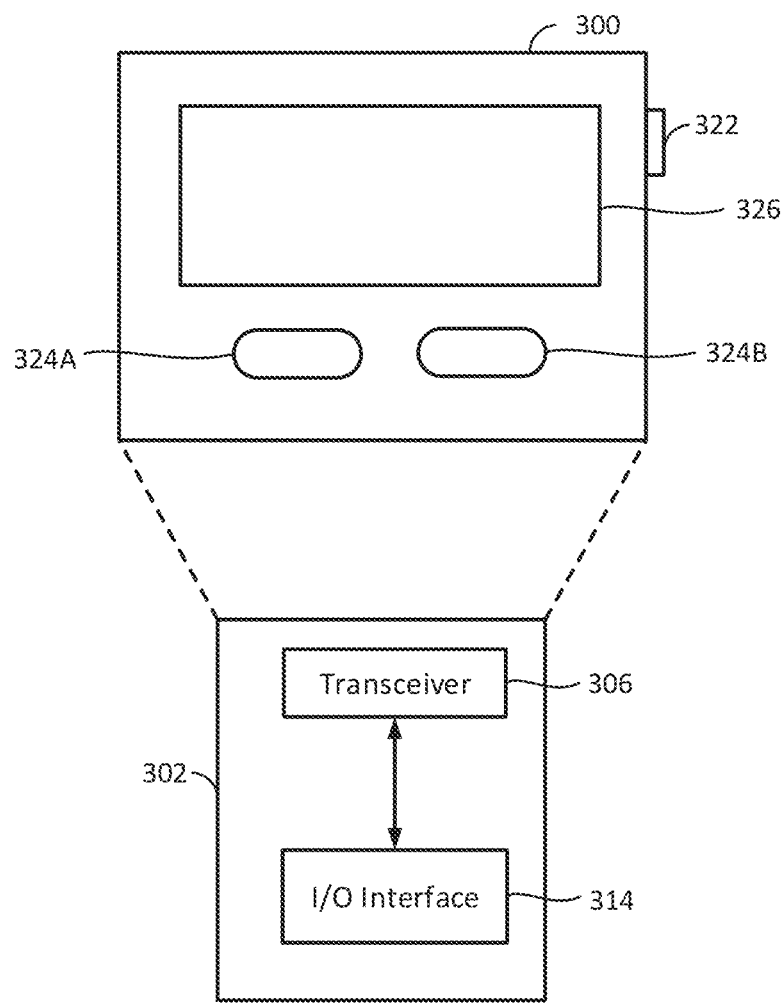
FIG. 3 illustrates an exemplary passive IoT device in accordance with aspects of the disclosure.

FIG. 3 illustrates a high-level example of a passive IoT device 300 in accordance with aspects of the disclosure. In general, the passive IoT device 300 shown in FIG. 3 may include various components that are the same and/or substantially similar to the IoT device 200 shown in FIG. 2, which was described in greater detail above. As such, for brevity and ease of description, various details relating to certain components in the passive IoT device 300 shown in FIG. 3 may be omitted herein to the extent that the same or similar details have already been provided above in relation to the IoT device 200 illustrated in FIG. 2.

The passive IoT device 300 shown in FIG. 3 may generally differ from the IoT device 200 shown in FIG. 2 in that the passive IoT device 300 may not have a processor, internal memory, or certain other components. Instead, in one embodiment, the passive IoT device 300 may only include an I/O interface 314 or other suitable mechanism that allows the passive IoT device 300 to be observed, monitored, controlled, managed, or otherwise known within a controlled IoT network. For example, in one embodiment, the I/O interface 314 associated with the passive IoT device 300 may include a barcode, Bluetooth interface, radio frequency (RF) interface, RFID tag, IR interface, NFC interface, or any other suitable I/O interface that can provide an identifier and attributes associated with the passive IoT device 300 to another device when queried over a short range interface (e.g., an active IoT device, such as IoT device 200, that can detect, store, communicate, act on, or otherwise process information relating to the attributes associated with the passive IoT device 300). Another difference between the IoT device 200 and the passive IoT device 300 is that because it lacks a processor and a memory, passive IoT device 300 may not have the capability to broadcast a SoftAP. A device such as passive IoT device 300 which cannot broadcast a SoftAP, but which may nevertheless be onboarded onto a Wi-Fi network via its transceiver, may be referred to throughout this disclosure as a client-only device or a leaf.

Although the foregoing describes the passive IoT device 300 as having some form of RF, barcode, or other I/O interface 314, the passive IoT device 300 may comprise a device or other physical object that does not have such an I/O interface 314. For example, certain IoT devices may have appropriate scanner or reader mechanisms that can detect shapes, sizes, colors, and/or other observable features associated with the passive IoT device 300 to identify the passive IoT device 300. In this manner, any suitable physical object may communicate its identity and attributes and be observed, monitored, controlled, or otherwise managed within a controlled IoT network.

Figure 4:
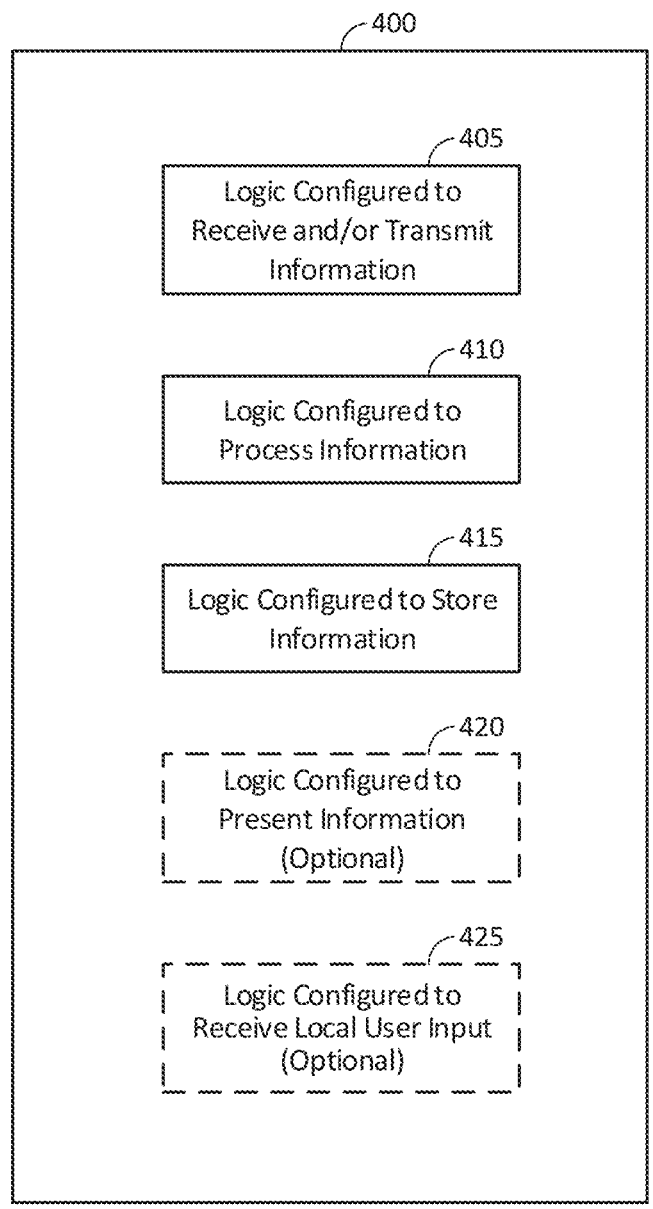
FIG. 4 illustrates a communication device that includes logic configured to perform functionality in accordance with an aspect of the disclosure.

FIG. 4 illustrates a communication device 400 that includes logic configured to perform functionality. The communication device 400 can correspond to any of the above-noted communication devices, including but not limited to IoT devices 110-120, IoT device 200, any components coupled to the Internet 175 (e.g., the IoT server 170), and so on. Thus, communication device 400 can correspond to any electronic device that is configured to communicate with (or facilitate communication with) one or more other entities over the wireless communications systems 100A-B of FIGS. 1A-B.

Referring to FIG. 4, the communication device 400 includes logic configured to receive and/or transmit information 405. In an example, if the communication device 400 corresponds to a wireless communications device (e.g., IoT device 200 and/or passive IoT device 300), the logic configured to receive and/or transmit information 405 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., the server 170), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to non-transitory RAM, flash memory, ROM, erasable programmable ROM (EPROM), EEPROM, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to the IoT device 200 as shown in FIG. 2 and/or the passive IoT device 300 as shown in FIG. 3, the logic configured to present information 420 can include the displays 226 and 326. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to the IoT device 200 as shown in FIG. 2 and/or the passive IoT device 300 as shown in FIG. 3, the logic configured to receive local user input 425 can include the buttons 222, 322, 224A, 324A, 224B, 324B, and the displays 226 and 326 (if a touchscreen), etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logic of 405 through 425 are shown as separate or distinct blocks in FIG. 4, it will be appreciated that the hardware and/or software by which the respective configured logic performs its functionality can overlap in part. For example, any software used to facilitate the functionality of the configured logic of 405 through 425 can be stored in the non-transitory memory associated with the configured logic to store information 415, such that the configured logic of 405 through 425 each performs their functionality (i.e., in this case, software execution) based in part upon the operation of software stored by the configured logic to store information 415 Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 5:
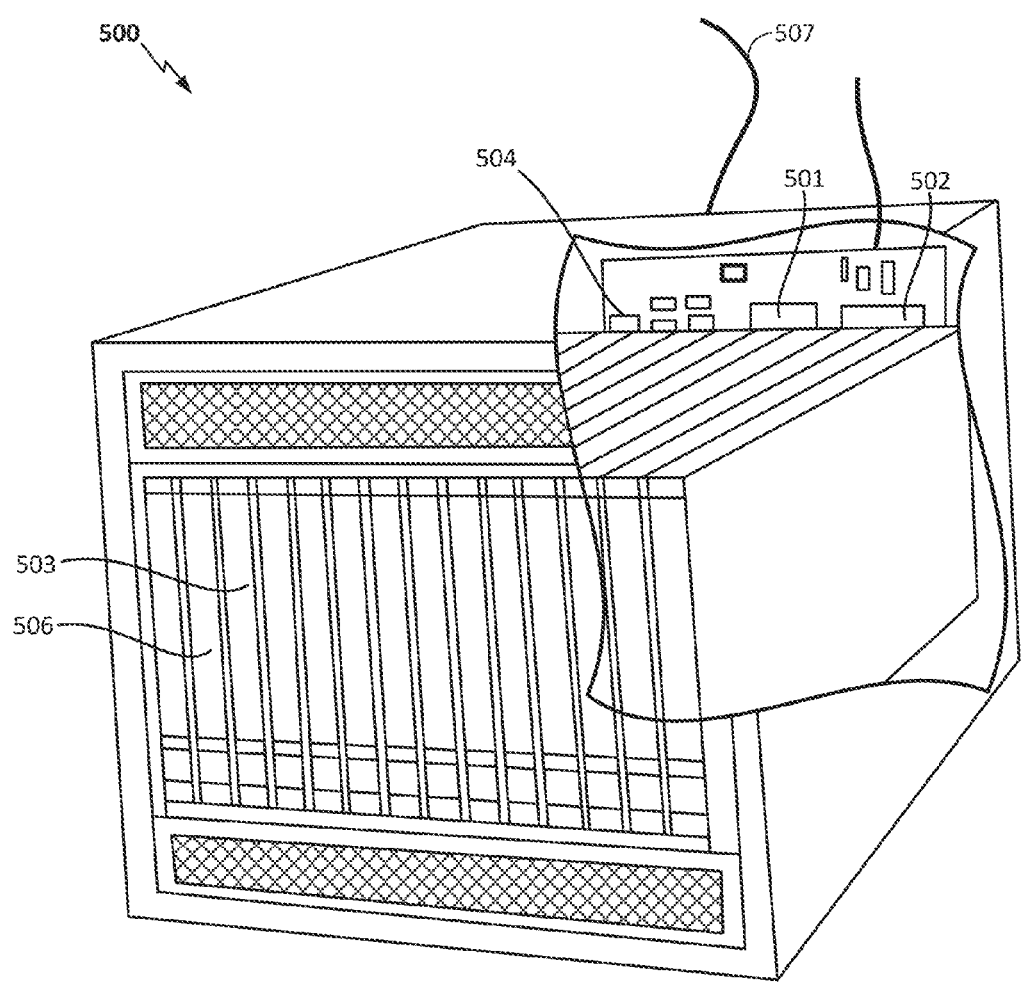
FIG. 5 illustrates an exemplary server according to various aspects of the disclosure.

The various embodiments may be implemented on any of a variety of commercially available server devices, such as server 500 illustrated in FIG. 5. In an example, the server 500 may correspond to one example configuration of the IoT server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access points 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to an IoT device implementation as in FIG. 2.

Figure 6:
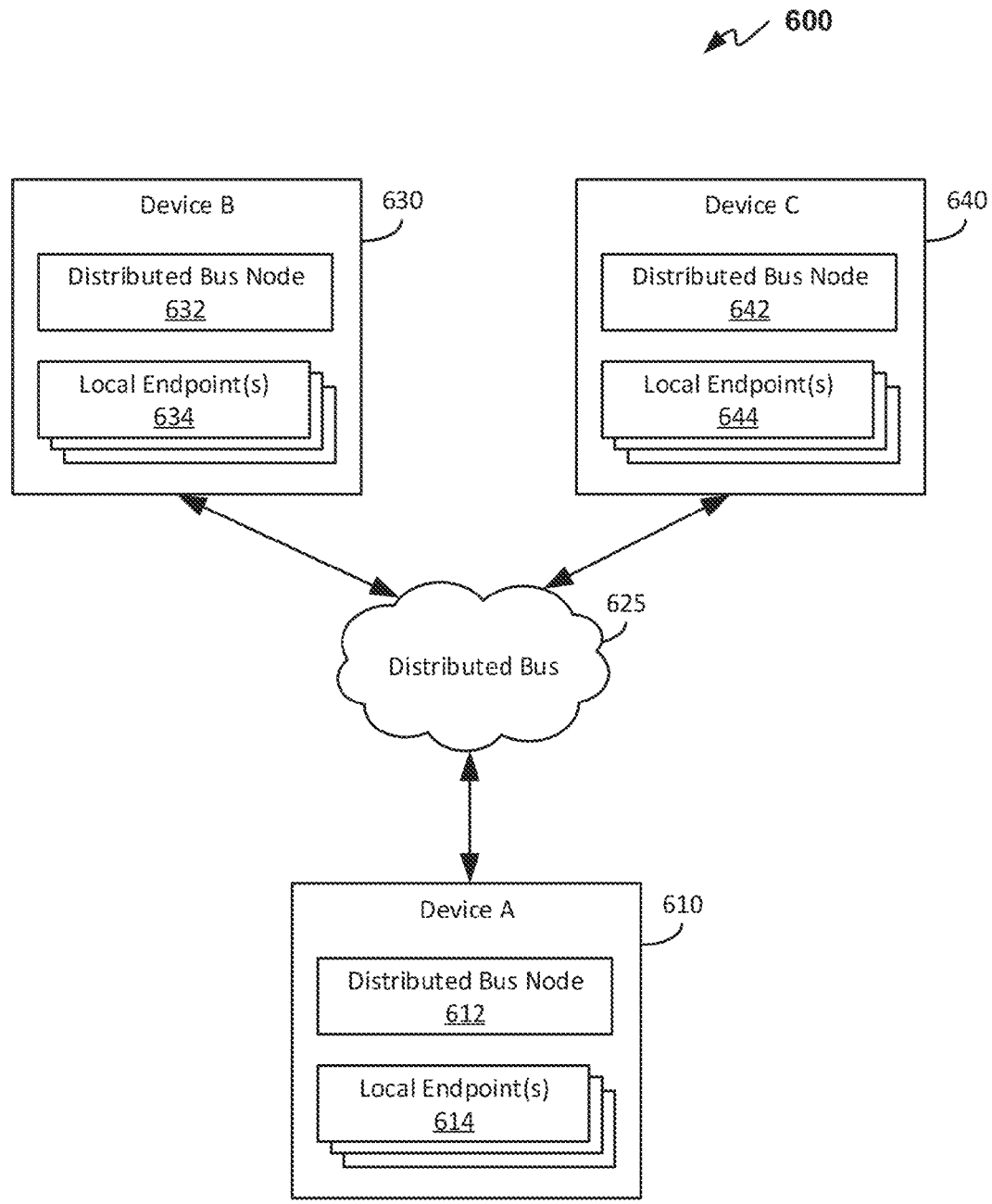
FIG. 6 illustrates an exemplary environment in which discoverable P2P services may be used to establish a proximity-based distributed bus over which various devices may communicate, in accordance with one aspect of the disclosure.
Figure 7:
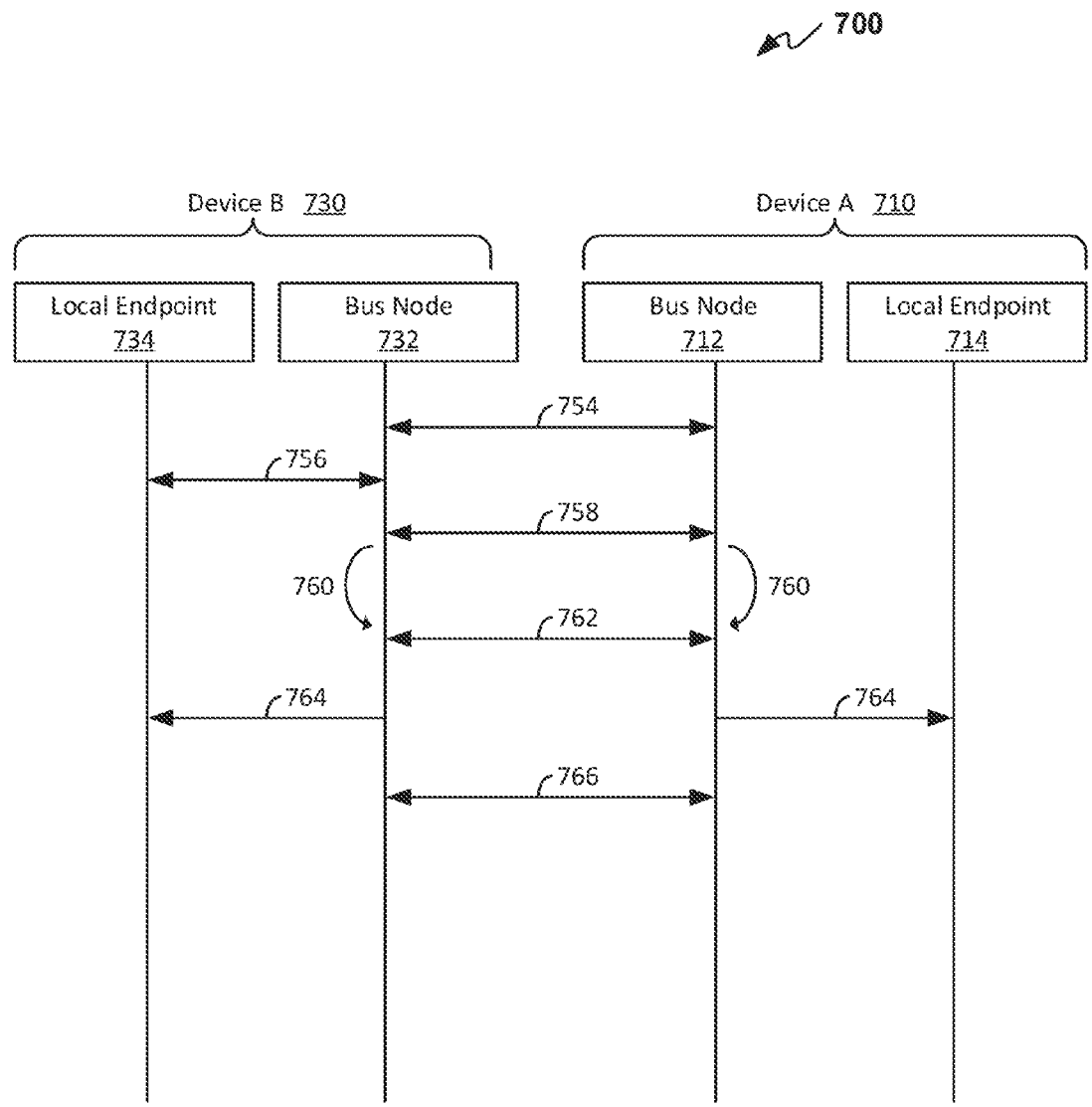
FIG. 7 illustrates an exemplary message sequence in which discoverable P2P services may be used to establish a proximity-based distributed bus over which various devices may communicate, in accordance with one aspect of the disclosure.

Although aspects of the disclosure allow for the distributed bulk onboarding of Wi-Fi enabled devices which may be discovered through existing Wi-Fi discovery protocols, including those currently known in the art, such as Simple Service Discovery Protocol (SSDP), Link Layer Discovery Protocol (LLDP), Neighbor Discovery Protocol (NDP), Universal Plug-N-Play (UPnP), it is contemplated that certain devices within a potential Wi-Fi network may also be easily discoverable to each other through P2P services. In various embodiments, it may be easier or more efficient for devices to communicate to each other via discoverable P2P services rather than Wi-Fi discovery. FIGS. 6 and 7 describe in detail the discovery and communication schemes of particular P2P discovery services.

According to one aspect of the disclosure, FIG. 6 illustrates an exemplary environment 600 in which discoverable P2P services may be used to establish a proximity-based distributed bus over which various devices 610, 630, 640 may communicate. For example, in one embodiment, communications between applications and the like, on a single platform may be facilitated using an interprocess communication protocol (IPC) framework over the distributed bus 625, which may comprise a software bus used to enable application-to-application communications in a networked computing environment where applications register with the distributed bus 625 to offer services to other applications and other applications query the distributed bus 625 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 625 (e.g., a "daemon" bus process) may handle message routing between the various devices 610, 630, 640.

In one embodiment, the distributed bus 625 may be supported by a variety of transport protocols (e.g., Bluetooth, TCP/IP, Wi-Fi, CDMA, GPRS, UMTS, etc.). For example, according to one aspect, a first device 610 may include a distributed bus node 612 and one or more local endpoints 614, wherein the distributed bus node 612 may facilitate communications between local endpoints 614 associated with the first device 610 and local endpoints 634 and 644 associated with a second device 630 and a third device 640 through the distributed bus 625 (e.g., via distributed bus nodes 632 and 642 on the second device 630 and the third device 640). As will be described in further detail below with reference to FIG. 7, the distributed bus 625 may support symmetric multi-device network topologies and may provide a robust operation in the presence of device drops-outs. As such, the virtual distributed bus 625, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections with among the first device 610, the second device 630, and the third device 640 without intervention when the various devices 610, 630, 640 come into range or proximity to each other.

According to one aspect of the disclosure, FIG. 7 illustrates an exemplary message sequence 700 in which discoverable P2P services may be used to establish a proximity-based distributed bus over which a first device ("Device A") 710 and a second device ("Device B") 730 may communicate. Generally, Device A 710 may request to communicate with Device B 730, wherein Device A 710 may a include local endpoint 714 (e.g., a local application, service, etc.), which may make a request to communicate in addition to a bus node 712 that may assist in facilitating such communications. Further, Device B 730 may include a local endpoint 734 with which the local endpoint 714 may be attempting to communicate in addition to a bus node 732 that may assist in facilitating communications between the local endpoint 714 on the Device A 710 and the local endpoint 734 on Device B 730.

In one embodiment, the bus nodes 712 and 732 may perform a suitable discovery mechanism at message sequence step 754. For example, mechanisms for discovering connections supported by Bluetooth, TCP/IP, UNIX, or the like may be used. At message sequence step 756, the local endpoint 714 on Device A 710 may request to connect to an entity, service, endpoint etc., available through bus node 712. In one embodiment, the request may include a request-and-response process between local endpoint 714 and bus node 712. At message sequence step 758, a distributed message bus may be formed to connect bus node 712 to bus node 732 and thereby establish a P2P connection between Device A 710 and Device B 730. In one embodiment, communications to form the distributed bus between the bus nodes 712 and 732 may be facilitated using a suitable proximity-based P2P protocol (e.g., the AllJoyn™ software framework designed to enable interoperability among connected products and software applications from different manufacturers to dynamically create proximal networks and facilitate proximal P2P communication). Alternatively, in one embodiment, a server (not shown) may facilitate the connection between the bus nodes 712 and 732. Furthermore, in one embodiment, a suitable authentication mechanism may be used prior to forming the connection between bus nodes 712 and 732 (e.g., SASL authentication in which a client may send an authentication command to initiate an authentication conversation). Still further, during message sequence step 758, bus nodes 712 and 732 may exchange information about other available endpoints (e.g., local endpoints 644 on Device C 640 in FIG. 6). In such embodiments, each local endpoint that a bus node maintains may be advertised to other bus nodes, wherein the advertisement may include unique endpoint names, transport types, connection parameters, or other suitable information.

In one embodiment, at message sequence step 760, bus node 712 and bus node 732 may use obtained information associated with the local endpoints 734 and 714, respectively, to create virtual endpoints that may represent the real obtained endpoints available through various bus nodes. In one embodiment, message routing on the bus node 712 may use real and virtual endpoints to deliver messages. Further, there may one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 732). In one aspect, virtual endpoints may receive messages from the local bus node 712 or 732, just like real endpoints, and may forward messages over the distributed bus. As such, the virtual endpoints may forward messages to the local bus nodes 712 and 732 from the endpoint multiplexed distributed bus connection. Furthermore, in one embodiment, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP-based virtual endpoints may be optimized for one hop routing (e.g., each bus node 712 and 732 may be directly connected to each other). Still further, Bluetooth-based virtual endpoints may be optimized for a single pico-net (e.g., one master and n slaves) in which the Bluetooth-based master may be the same bus node as a local master node.

At message sequence step 762, the bus node 712 and the bus node 732 may exchange bus state information to merge bus instances and enable communication over the distributed bus. For example, in one embodiment, the bus state information may include a well-known to unique endpoint name mapping, matching rules, routing group, or other suitable information. In one embodiment, the state information may be communicated between the bus node 712 and the bus node 732 instances using an interface with local endpoints 714 and 734 communicating with using a distributed bus based local name. In another aspect, bus node 712 and bus node 732 may each may maintain a local bus controller responsible for providing feedback to the distributed bus, wherein the bus controller may translate global methods, arguments, signals, and other information into the standards associated with the distributed bus. At message sequence step 764, the bus node 712 and the bus node 732 may communicate (e.g., broadcast) signals to inform the respective local endpoints 714 and 734 about any changes introduced during bus node connections, such as described above. In one embodiment, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and the bus node 732 become disconnected may be indicated with name owner changed signals.

As used above, well-known names may be used to uniquely describe local endpoints 714 and 734. In one embodiment, when communications occur between Device A 710 and Device B 730, different well-known name types may be used. For example, a device local name may exist only on the bus node 712 associated with Device A 710 to which the bus node 712 directly attaches. In another example, a global name may exist on all known bus nodes 712 and 732, where only one owner of the name may exist on all bus segments. In other words, when the bus node 712 and bus node 732 are joined and any collisions occur, one of the owners may lose the global name. In still another example, a translated name may be used when a client is connected to other bus nodes associated with a virtual bus. In such an aspect, the translated name may include an appended end (e.g., a local endpoint 714 with well-known name "org.foo" connected to the distributed bus with Globally Unique Identifier "1234" may be seen as "G1234.org.foo").

At message sequence step 766, the bus node 712 and the bus node 732 may communicate (e.g., broadcast) signals to inform other bus nodes of changes to endpoint bus topologies. Thereafter, traffic from local endpoint 714 may move through virtual endpoints to reach intended local endpoint 734 on Device B 730. Further, in operation, communications between local endpoint 714 and local endpoint 734 may use routing groups. In one aspect, routing groups may enable endpoints to receive signals, method calls, or other suitable information from a subset of endpoints. As such, a routing name may be determined by an application connected to a bus node 712 or 732. For example, a P2P application may use a unique, well-known routing group name built into the application. Further, bus nodes 712 and 732 may support registering and/or de-registering of local endpoints 714 and 734 with routing groups. In one embodiment, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 732 may send signals to notify other remote bus nodes or additions, removals, or other changes to routing group endpoints. In such embodiments, the bus node 712 or 732 may send a routing group change signal to other group members whenever a member is added and/or removed from the group. Further, the bus node 712 or 732 may send a routing group change signal to endpoints that disconnect from the distributed bus without first removing themselves from the routing group.

Figure 8:
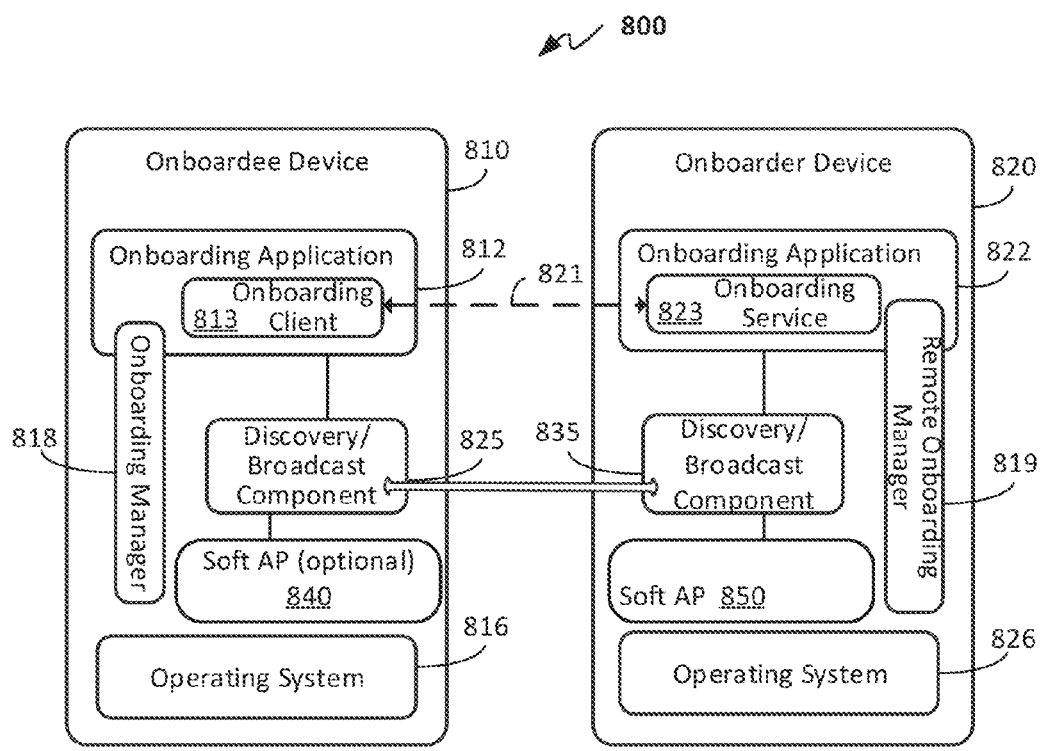
FIG. 8 illustrates an exemplary system architecture in which one device may onboard another onto a Wi-Fi network, in accordance with one aspect of the disclosure.
Figure 8A:
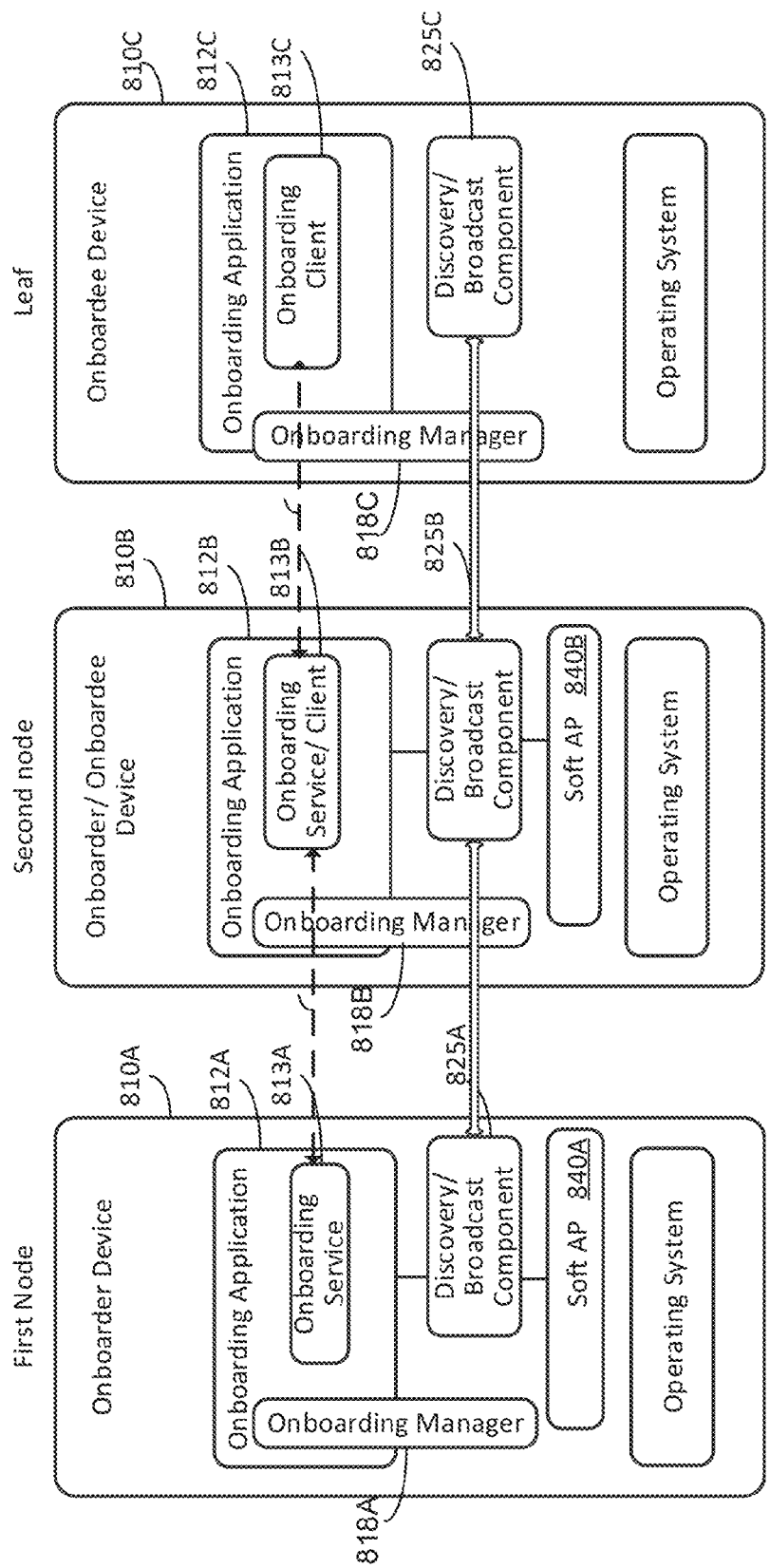
FIG. 8A is a block diagram depicting an exemplary system architecture in which three devices may be used to implement a method for distributed bulk onboarding in accordance with an aspect of the disclosure.

According to an aspect of the disclosure, FIG. 8 illustrates an exemplary system architecture 800 in which devices containing a suitable onboarding service application may be used to facilitate distributed bulk onboarding of devices in a Wi-Fi network. As shown in FIG. 8, the system architecture 800 may include an onboardee device 810 attempting to associate and authenticate to via an onboarder device 820 with an onboarding service 823 and thereby join the Wi-Fi network, wherein the onboardee device 810 may correspond to a new device that has not previously been configured to access the Wi-Fi network or a device that was previously configured to access the Wi-Fi network and subsequently offboarded (e.g., to reset the device to factory-default settings or otherwise change a configuration state associated with the device, to change a configuration state associated with the Wi-Fi network, etc.). Furthermore, the system architecture 800 may include an onboarder device 820 that has been configured and validated on the Wi-Fi network. Certain embodiments of this architecture may utilize P2P services to discover onboardee devices that it may onboard to the Wi-Fi network, utilizing the method fully disclosed in commonly owned and currently pending U.S. application Ser. No. 14/279,760, "Using Discoverable Peer-to-Peer Services to Allow Remote Onboarding of Headless Devices Over a Wi-Fi Network," which is incorporated by reference herein in its entirety. Alternatively, onboardee devices may be discovered through various other mechanisms described throughout this document (e.g., Wi-Fi scanning, P2P platform discovery, a commonly known API, etc.). Therefore, each device in FIGS. 8 and 8A is depicted as having a generic discovery/broadcast component (e.g., discovery/broadcast components 825 and 835).

The onboarder device 820 is designated as a node and comprises a SoftAP 850, The SoftAP 850 comprises several components, which will be described in further detail presently, that execute the processes relating to providing the configuration information of a Wi-Fi network from an onboarder device 820 to an onboardee device 810. One component of the SoftAP 850 may be a discovery/broadcast component 835, which allows other devices to discover that the onboarder device 820 comprises a SoftAP and is capable of onboarding other devices. This discovery/broadcast component 835 may allow discovery, by known and yet-to-be-implemented Wi-Fi discovery protocols, of discoverable P2P services as described throughout this disclosure.

In an embodiment, the onboarder device 820 and the onboardee device 810 may run respective onboarding applications 812, 822 that communicate with respective peer-to-peer (P2P) platforms (not shown) that may exist in that provide the discoverable P2P services that may facilitate the remote onboarding (e.g., the AllJoyn™ software framework mentioned above). As such, the onboardee device 810 and the onboarder device 820 may communicate with one another using the mechanisms described in further detail above to form a distributed bus (not shown) between the discovery/broadcast components 825 and 835 that may enable communication between the respective onboarding applications 812, 822, which may correspond to the local endpoints described above in connection with FIGS. 6-7. Furthermore, in an embodiment, the onboardee device 810 and the onboarder device 820 may run respective operating systems 816, 826 that run a host "daemon" bus process to handle message routing between the onboardee device 810 and the onboarder device 820. For example, in an embodiment, the respective onboarding applications 812, 822 may communicate with the respective host daemons running on the onboardee device 810 and the onboarder device 820, wherein the respective host daemons may implement local segments of the distributed bus and coordinate message flows across the distributed bus (not shown) between the discovery/broadcast components 825 and 835. In this configuration, an onboarding service 823 connects with an onboarding client 813 via an onboarding service application programming interface (API) 821 that is implemented by the onboarding service 823 and the onboarding client 813. This enables the onboarding application 822 to make remote method calls via the onboarding service 823 and the onboarding client 813 to the onboarding manager 818 that facilitates certain processes to configure and validate the onboardee device 810 in order to access the Wi-Fi network, as will be described in further detail herein. In this manner, the onboarding application 812 can communicate with the onboarding manager 818 as though the onboarding manager 818 were a local object, wherein parameters may be marshaled at the source and routed off of the local bus segment by the local host daemon and then transparently sent over a network link to the local host daemon on the onboarder device 820. The daemon running on the onboarder device 820 may then determine that the destination is the local onboarding application 822 and arrange to have the parameters unmarshaled and the remote method invoked on the local onboarding application 822.

As such, the daemons may generally run in one or more background processes and the onboarding applications 812, 822, the onboarding manager 818, and the remote onboarding manager 819 may run in separate processes, whereby the onboarding applications 812, 822, the onboarding manager 818, and the remote onboarding manager 819 may have respective local "bus attachments" that represent the local host daemon and handle message routing therebetween. Alternatively, in certain cases, the onboardee device 810 may be a thin client, an embedded device, or another device that has a constrained operating environment (e.g., limited size, memory, processor speed, power, peripherals, user interfaces, etc.). As such, where the onboardee device 810 has limited capabilities, bundling local bus attachments into each application or service that uses the P2P platform 814 may interfere with performance (e.g., because substantial bus attachments may require substantial network connections, memory, etc.). In these cases, rather than having a local bus attachment within the onboarding application 822 and/or the onboarding service 823, the onboarding application 822 may instead employ a thin client application program interface and the P2P platform (not shown) may instead employ a thin client process that utilizes the host daemon on the onboardee device 810 running the onboarding application 812. However, in either case, the call flows and behavior that occur between the onboardee device 810 and the onboarder device 820 to configure and validate the onboardee device 810 in order to access the Wi-Fi network may be substantially the same whether the onboarding application 812 implements a local bus attachment to communicate with the host daemon or communicates directly with the host daemon.

Having provided the above overview relating to the system architecture in which devices broadcasting SoftAPs may be used for distributed bulk onboarding of other devices broadcasting SoftAPs as well as client-only onboardee devices over a Wi-Fi network, various aspects that relate to the specific mechanisms that may be used to allow distributed bulk onboarding will now be described.

FIG. 8A depicts three exemplary devices that may implement a portion of the distributed bulk onboarding method. In contrast to FIG. 8, the devices in FIG. 8A are shown with the onboarding taking place from left to right. In the example shown, a first onboarder device 810A is also labeled as a first "node." A second onboardee/onboarder device 810B is labeled as a second "node." A third onboardee device 810C is labeled as a "leaf." Throughout the rest of this disclosure, all computing devices or other IoT devices within a network that have a SoftAP (e.g., SoftAP 840A, 840B) shall be referred to as "nodes." All computing devices or other IoT devices that do not have a SoftAP shall be referred to as "leaves." The designations of nodes and leaves refers to the topological relationship between various devices when in a potential network to be onboarded using a distributed bulk onboarding process.

As depicted, the first node 810A and second node 810B have identical logical components, including all components that comprise or interact with the SoftAPs 840A and 840B. The first node 810A and second node 810B are depicted to illustrate that the second node 810B can first be an onboardee device when it is given the necessary Wi-Fi configuration information from the SoftAP 840A of onboarder device 810A. Then, the second node 810B can become the onboarder device in relation to the leaf/onboardee device 810C. The first node 810A is characterized at least in part by the fact that it has an onboarding "service" 813A as part of its onboarding application 812A. The onboarding service 813A may have functionality to provide Wi-Fi configuration information to another device. The onboarder device 810A may also have an onboarding client (not shown) as part of its onboarding application 812A, the client having functionality to accept Wi-Fi configuration information from another device. The second node 810B is depicted as having an onboarding service/client 813 as part of its onboarding application 812B that operates as a service and a client. Both the onboarder device 810A and the onboarder/onboardee device 810B, therefore, have the appropriate onboarding services that allows them to provide Wi-Fi credentials to another device. The presence of this kind of onboarding service distinguishes the devices as ones that broadcast SoftAPs (e.g., 840A, 840B). In contrast, the leaf onboardee device 810C does not have an onboarding service, but rather only an onboarding client 813C as part of its onboarding application 812C. Therefore, it cannot be characterized as broadcasting a SoftAP, and is not depicted as having one. A Wi-Fi capable device may not have an onboarding service for a number of reasons, such as that it is constrained in power, memory, or function. However, Wi-Fi connected devices generally need at least some kind of onboarding client interface in order to be connected to a Wi-Fi network at all.

Distributed Bulk Onboarding via Divide and Conquer Method

Bulk onboarding of devices refers to onboarding a plurality of devices. There need not be a particular number of devices in a network to qualify as "bulk," but for the purposes of this disclosure, it is contemplated that at least three devices may be used to perform the bulk onboarding method. Throughout this disclosure, the terms "onboarding" and "configuring" may be used interchangeably. In the depicted method, an algorithm that may be referred to as a "divide and conquer algorithm," is applied to solve the problem of bulk onboarding of devices, and to reduce the time it takes to configure many devices to the same Wi-Fi network. It is known in the art that the process of onboarding, or configuring the Wi-Fi connectivity of a single device can take up to 30-60 seconds. Configuring, as described with reference to FIG. 8, may comprise detecting a device, providing an API, providing security credentials, and verifying the secure connection. It is also known in the art that a single onboarding device that is providing a SoftAP can only onboard or configure one device at a time. The greater the number of devices that need to be onboarded at once, the longer it takes to onboard all of them. If there were 100 devices to onboard, for example, the prior art process could take an hour or more. Such a scenario of needing to onboard such a large number of devices at once could occur under several circumstances.

Many homes and businesses typically create secure Wi-Fi networks comprising at least one Wi-Fi router to connect to the internet. When a user first sets up a new Wi-Fi router, usually at least one computer with a user interface must be used to establish security credentials, such as an SSID (Service Set Identifier, or network name), an encryption level, and a password of the router in order to allow future devices to be onboarded onto the secure Wi-Fi network. This process typically requires the user to open a router administration tool on the computer user interface, log in to the router, and enter internet connection information. In some cases, if the router is replacing an old router, the user may need to update the MAC (media access control) address as well. Then the user must verify that the internet connection is working. The configuration of the computer itself to the network via the router may take place through the same setup tool with a few more steps. At this point, the wireless router is connected to the internet and has established security credentials for devices that will be configured to it, and the first computer is configured to the secure wireless network by verifying those security credentials. Additional devices that are connected to the Wi-Fi network each need to be configured with the SSID, encryption level, and password as well. Often, this process is accomplished during the initial set-up of the device. For example, a wireless printer may have its own graphical user interface, or it may use an installation driver visible on a computer that it is wirelessly connected to in order to be configured to the Wi-Fi network. That is, the user may either input all the configuration credentials through a user interface on the printer hardware itself, or the user may input the configuration credentials through an interface on the computer.

As another example, many entertainment systems now connect to a secure home Wi-Fi network. Many "smart TVs" have integrated Wi-Fi radios. Such TVs are often configured using the TV screen itself as the interface. Many smart TV users also use specific content-streaming devices (such as Apple TV®, Google Chromecast®, and Roku®) to play audio and video content from websites (such as Netflix®, Hulu®, Amazon® iTunes®) on the TV. Often, the content streaming devices themselves have built-in Wi-Fi radios, on which credentials may be entered either through the TV, through an interface on a connected computer, or on an interface on a user's mobile device.

As IoT devices become more popular, it is possible that a single home may have dozens of IoT devices connected on a single secure WiFi network. For example, a home may have multiple desktop computers, printers, tablet computers, mobile phones, but may also have several more IoT devices connected over WiFi. Many IoT devices do not have user interfaces (e.g., passive IoT device 200B), yet they connect to Wi-Fi. These devices often need to be configured through an interface on a mobile communication device (such as a smartphone or tablet) or another type of computing device.

Businesses with asset tracking systems may have hundreds of IoT devices within one facility. It is possible that certain scenarios could cause all, or most, of the devices in a single home or business to be off-boarded at once. For example, in the case of a power outage, devices that rely on mains AC power may be reset, and even battery-powered IoT devices may need new configuration information if the main Wi-Fi router itself was knocked offline. There are other scenarios in which it may be desirable to change security settings or other configuration settings of a secure Wi-Fi network, but doing so would cause many devices to be off-boarded because the devices would no longer have the correct security credentials. As security of Wi-Fi networks, and cybersecurity in general become of greater concern, individuals and companies may desire to change security credentials more frequently. For example, users may wish to upgrade their Wi-Fi routers, or to change their passwords at given time intervals, or to change other security settings based on a specific security threat.

Figure 9:
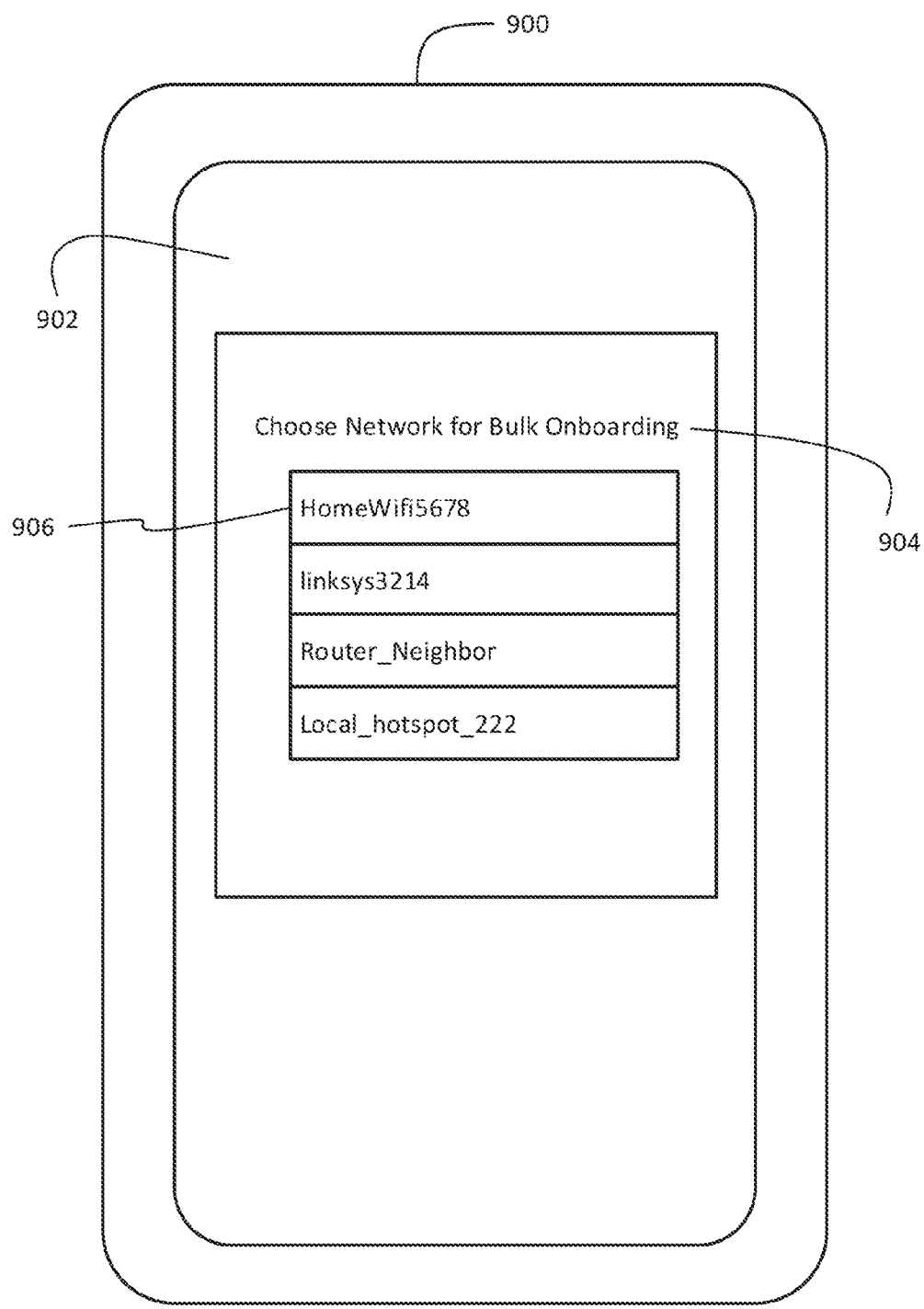
FIG. 9 is a depiction of a bulk onboarding configuration device and a user interface presenting a selection tool, in accordance with an aspect of the disclosure

In order to accomplish the efficient and secure onboarding of multiple devices on a secure Wi-Fi network, the present disclosure provides a system and method for distributed bulk onboarding. Turning now to FIG. 9, shown is a bulk onboarding configuration device 900, which is a computing device with a graphical user interface 902. The bulk onboarding configuration device 900 depicted in the embodiment shown can be implemented by any computing device that has a screen, can accept user input, can broadcast a Soft AP through an onboarding service, and is connected to the Wi-Fi network onto which devices are to be onboarded. The bulk onboarding configuration device 900 may comprise all of the components of the onboarder device 820, and may comprise additional components which will be described with reference to FIG. 11. The bulk onboarding configuration device 900 may be implemented by devices such as, but not limited to, a desktop computer, laptop computer, tablet computer, smartphone, PDA, or a device integration hub. Device integration hubs may be standalone units that exist for the purpose of allowing multiple IoT devices to communicate to each other. In certain embodiments, device integration hubs may be implements as the supervisor device 130 in FIGS. 1B and 1D, for example. In embodiments of the disclosure, the graphical user interface 902 can present network configuration information to a user. In FIG. 9, network configuration information can include which detectable Wi-Fi network may be joined by devices to be onboarded. For example, the user interface 902 may present a selection tool 904 to allow the user to select a network. The selection tool may present several networks that are detected by the bulk onboarding configuration device's 900 wireless radio, as is known in the art. In the embodiment depicted, the user's home network 906 is the desired network to join. The user may select the home network 906 by known ways of user input, such as by a touchscreen, stylus, keyboard, dial, etc.

Figure 10:
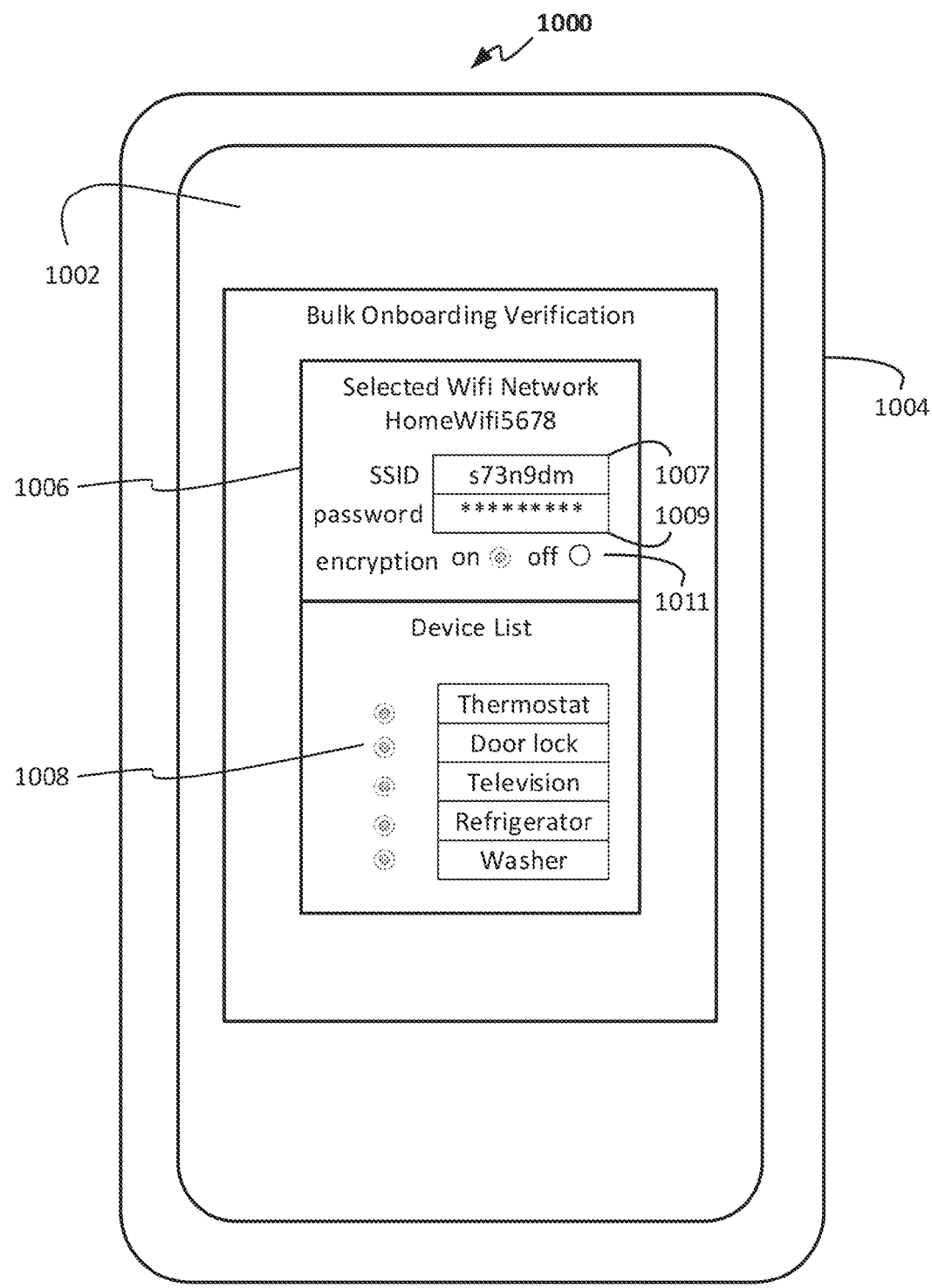
FIG. 10 is a depiction of a bulk onboarding configuration device and a user interface presenting a configuration tool, in accordance with one aspect of the disclosure.

FIG. 10 shows a bulk onboarding configuration device 1000 with a user interface 1002, which may be similar to the bulk onboarding configuration device 900 with the user interface 902. The device 1000 may present a configuration tool 1004 subsequent to the user having selected a particular network on the selection tool 904. The selection tool 904 and configuration tool 1004 may be part of a single application, or the configuration tool 1004 may be a separate application. The configuration tool 1004 may comprise a security credential input 1006 and a device list 1008. The security credential input 1006 may include an input for an SSID 1007, a password 1009, and an encryption setting 1011. In the embodiment shown, the encryption setting 1011 is depicted as either "on" or "off." It is contemplated that other kinds of visual representation of encryption may exist. For example, there may be selection tools for WEP, WPA, or WPA2 encryption. In some embodiments, there may not be an encryption setting, either because the encryption setting has a default that cannot be changed by the user, or because there is no encryption. The user may enter any or all of the security credentials by known ways of user input, such as by a touchscreen, stylus, keyboard, dial, etc.

Another aspect of the configuration tool 1004 is the device list 1008. The device list 1008 may present the user with a possible list of devices to onboard. Devices that appear on the device list 1008 may be devices that are within the Wi-Fi signal range of the router and present at least an onboarding client interface (such as the onboarding client 813 of FIG. 8), if not also a SoftAP, with which to connect.

As discussed previously, some devices may have user interfaces, but some IoT devices may not have user interfaces, and instead may only have an onboarding client interface for accepting connection information. That is, they may be clients only; they may be connected to, and controlled via a Wi-Fi network without a user interface. These Wi-Fi clients may also be known as "headless devices," or alternatively, as "client-only" devices. As will be described later in this disclosure, devices that are part of a scheme for bulk distributed onboarding may be referred to by their ability to onboard other devices in the context of trees, nodes, and leaves. Specifically, the relationship of all the devices can be described as a tree, and certain devices that present SoftAPs can be described as nodes, and certain devices that are "client-only" can be described as leaves. Details of the relationship of devices in a tree will be described in further detail.

Figure 11:
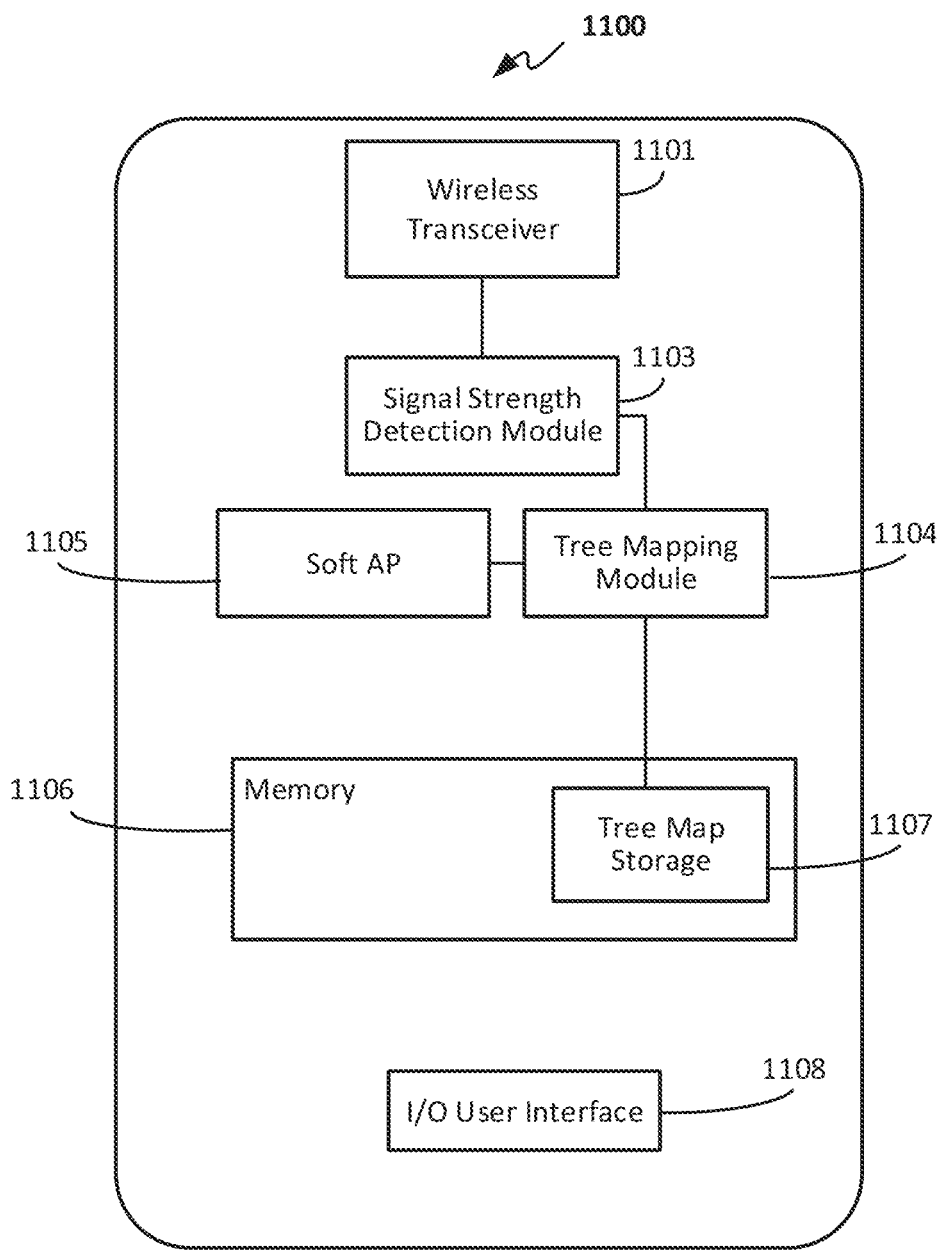
FIG. 11 is a block diagram depicting logical components of a bulk onboarding configuration device, in accordance with one aspect of the disclosure.

Turning now to FIG. 11, shown is a logical diagram depicting some of the components of a bulk onboarding configuration device 1100, which may be similar to bulk onboarding configuration devices 900 and 1000. Those skilled in the art can appreciate that various logical components depicted in FIG. 11 may include aspects of IoT device 200A of FIG. 2A, as well as aspects of onboarder device 820 of FIG. 8 and communication device 1400 of FIG. 14. As shown in FIG. 11, the device that is implemented as bulk onboarding configuration device 1100 has additional logical components that can implement aspects of its functionality. These components may include a signal strength detection component 1103, which is in communication with the wireless transceiver 1101. The signal strength detection component may detect which devices are nearest to the bulk onboarding configuration device 1100 or to a Wi-Fi router, and which devices are further away (e.g., through a Wi-Fi scan). Additionally, the signal strength detection component 1103 may detect whether another device is broadcasting a SoftAP and may be used as a node, or whether another device is broadcasting that it is an onboarding client-only device and must be onboarded as a leaf. The signal strength detection component 1103 may be implemented by, for example, the discovery/broadcast component 835 of FIG. 8. The signal strength detection component 1103 may be integrated with such a discovery/broadcast component, or may be a separate component. Alternatively, other components within the device may distinguish between nodes and leaves, namely the SoftAP 1105 or the tree-mapping component 1104. The signal strength detection component 1103 is in communication with the tree mapping component 1104, which allows the tree mapping component 1104 to create a map of all the nodes and leaves in the potential Wi-Fi network. As will be described in further detail later in this disclosure, the tree mapping component 1104 may indeed construct a full map of the locations of each device in the potential network. Additionally or alternatively, the tree mapping component 1104 may construct a set of instructions to provide to other devices in the potential network, or it may provide a decision algorithm to provide to other devices in the potential network. The tree mapping component 1104 may be in communication with a tree map storage component 1107 which resides in a memory 1106 (e.g., volatile or non-volatile memory). In aspects of the disclosure, the tree mapping component 1104 may be realized within a non-transitory, tangible processor-readable storage medium encoded with processor readable instructions, along with a processor itself, to create a tree map. In other instances, the tree mapping component may be implemented in a discrete hardware component, such as an FPGA. Additionally, the tree mapping component 1104 may be in communication with the SoftAP 1105. The bulk onboarding configuration device 1100 may have the SoftAP 1105 in order to onboard other devices itself. The SoftAP 1105 may provide configuration information (e.g., SSID and password information) as well as tree mapping information to the other nodes that it onboards. It is contemplated that in most embodiments, the bulk onboarding configuration device 1100 may comprise an input/output user interface 1108, which may be a graphical user interface, so that a user may input the required Wi-Fi credentials, as shown in FIGS. 9 and 10.

Within a given secure Wi-Fi network, such as a home or a business, several network devices may have the capability to be Soft APs. Soft APs, as discussed in some detail previously, allow computing devices to become wireless access points and act like Wi-Fi routers or "hotspots" themselves. There are some devices (i.e., Wi-Fi routers) that are sold as dedicated access points, or repeaters, for the purposes of increasing the transmission range of a single secure Wi-Fi network and could be characterized as a SoftAP, but a SoftAP as generally used in this disclosure refers to a device with at least a Wi-Fi transceiver (e.g., transceiver 206 of FIG. 2A) and an onboarding service within an onboarding application (e.g. onboarding service 813 within onboarding application 812) to act as an access point, even though the device has other primary purposes. It is contemplated that many, or in some cases, all the devices within a particular network may have Soft APs. It is also contemplated that there may be some IoT devices in a network that are particularly constrained (i.e., limited in terms of memory, processing resources, and/or power usage) that may have Wi-Fi radios but may not have Soft APs. That is, they may be Wi-Fi clients only. A device may have a Soft AP whether or not it has a user interface (i.e., whether or not it is headless). Though it may be common now for Soft APs only to be found on more robust devices, such as smartphones, laptop computers, desktop computers, tablet computers, and smart TVs, more and more IoT devices are capable of having a Soft AP. It is contemplated that in the near future, it may be commonplace for every IoT device to have a Soft AP.

Figure 12:
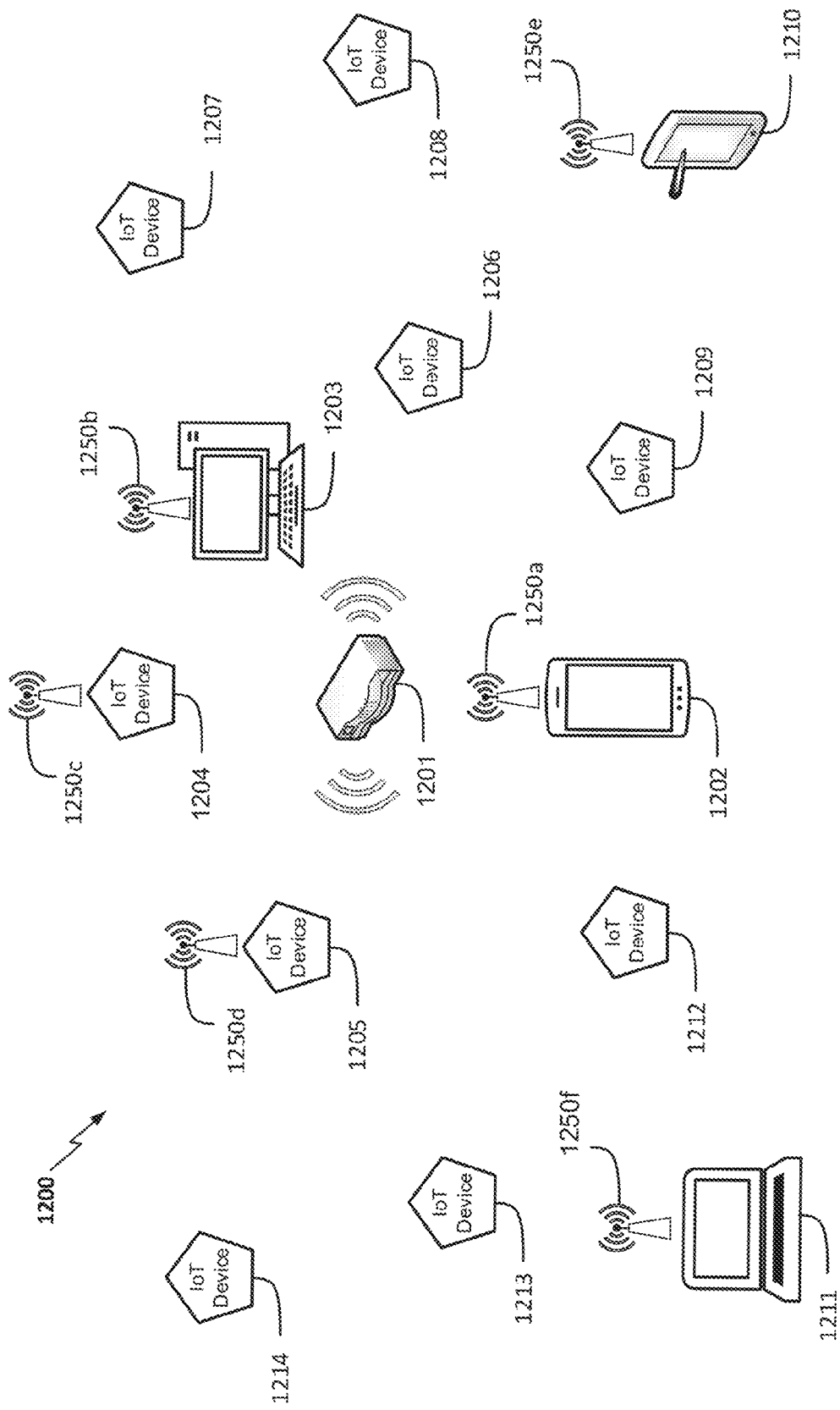
FIG. 12 is a diagram of multiple computing devices and IoT devices used to illustrate systems and methods of distributed bulk onboarding in accordance with aspects of the disclosure.

An aspect of the disclosure is that devices with Soft APs may be used to facilitate distributed bulk onboarding of devices in a network. FIG. 12 shows an exemplary sequence of devices being onboarded in accordance with embodiments of this disclosure. All the devices in FIG. 12 are in, or may potentially be within a secure Wi-Fi network 1200. That is, the devices in FIG. 12 are all within the range of a Wi-Fi router 1201. Therefore, the network 1200 may be referred to throughout the disclosure as a "potential" network, in recognition of the circumstances and time periods in which the devices are in range, but not yet configured onto the secure network. The secure Wi-Fi network 1200 may have at least one main dedicated Wi-Fi router 1201, which broadcasts a Wi-Fi signal. A user interface, with a configuration tool 1004 as described in FIGS. 9 and 10, may be implemented by a smartphone 1202. Though the present example depicts a smartphone 1202 as the bulk onboarding configuration device that presents the configuration tool 1004, other types of computing devices may comprise the bulk onboarding configuration device. An aspect of the disclosure is that the configuration tool may create a "balanced tree" of all the Soft AP devices, which may be known as nodes, within the potential Wi-Fi network. The balanced tree may also include any client-only devices that may be connected to the Wi-Fi network, but which do not have Soft APs. These client-only devices may be known as leaves. The mapped tree is balanced in that the Soft AP devices, or nodes, are mapped according to the signal strength properties between various devices for efficiency of onboarding, such that the nodes with the strongest signal strength properties are more likely to be onboarded first, and the nodes with weaker signal strength are likely to be onboarded later, by being reached through nodes with stronger signal strength properties.

Wi-Fi signal strength between devices can depend on several factors. For signal strength between the Wi-Fi router 1201 itself and any device in the network, signal strength may be impacted by the physical distance between the objects, physical barriers deflecting the signal, and the capability of the network adapter or Wi-Fi radio on the device itself. Referring briefly back to FIG. 11, an aspect of the disclosure is that the bulk onboarding configuration device 1100 (e.g., the smartphone 1202 in FIG. 12) may have a tree-mapping component 1104 and a signal strength detection component 1103 to implement the tree mapping functionality.

Turning back to FIG. 12, the devices within the network 1200 are depicted at various physical distances from the router 1201. For example, there is a desktop computer 1203, an IoT device 1204, and an IoT device 1205 located at approximately the same physical distances away from the router 1201. In the diagram, the devices within the potential network 1200 that can be used as Soft APs are depicted with an antenna symbol representing Soft APs 1250a-1250f. The smartphone 1202 has a SoftAP 1250a, the desktop computer 1203 has a SoftAP 1250b, the IoT device 1204 has a SoftAP 1250c, and the IoT device 1205 has a SoftAP 1250d. There are additional devices in the network that are further away from the Wi-Fi router 1201, which include IoT devices 1206, 1207, 1208, 1209, 1212, 1213, and 1214, which do not have SoftAPs. There are also two additional devices in the network: a tablet computer 1210 and a laptop computer 1211. Both the tablet computer 1210 and the laptop computer 1211 are depicted as being approximately as far away from the Wi-Fi router 1201 as any other device in the network, and both have SoftAPs 1250e and 1250f, respectively. It is contemplated that in implementations of the disclosure, there may be dozens or hundreds of computing devices and IoT devices in a potential network to be onboarded. These devices may be spread out over several floors of a house or a building, and include all devices within the reach of a particular Wi-Fi router that forms the basis of a particular secure wireless network To begin the process of bulk onboarding all the devices on the network 1200, the smartphone 1202 may be onboarded first, in many embodiments. It is contemplated that in these embodiments, the smartphone 1202 is onboarded first because it is the bulk onboarding configuration device. In order to determine an efficient way of onboarding all the devices within the potential Wi-Fi network 1200, the smartphone 1202 may first create a tree of all the potential nodes and leaves throughout the network. In order to create a tree, the smartphone 1202 may receive information that is broadcasted (or is otherwise discoverable) from individual devices. This information indicates what devices are within range of the Wi-Fi router 1201, which of those devices have SoftAPs (nodes), and which devices may be Wi-Fi clients-only (leaves). Additionally, this information may include the signal strength as between the Wi-Fi-router and SoftAP devices. This signal strength is not only a function of the strength of the Wi-Fi router's radio and the distance to a particular SoftAP device, but also a function of the strength of a particular SoftAP device's wireless radio. Various devices may have wireless radios that broadcast and receive signals at different IEEE 802.11 standards. For example, a newer desktop computer, such as desktop computer 1203 may have a dual-band wireless radio that broadcasts at the 2.4 GHz and 5 GHz ISM bands, whereas a less robust IoT device, such as IoT device 1204 may only broadcast at the 2.4 GHz band, which is more prone to interference and network traffic.

The signal strength information about various SoftAPs in the network may be relevant to determine which nodes may be most efficient in onboarding other nearby devices. Another piece of information regarding signal strength may include the signal strength as between any SoftAP that may be used to onboard a client-only device (i.e., one that does not have a SoftAP) and the client-only device itself. The signal strength may be a function of the SoftAP wireless radio and the distance between a node and a particular client. It is contemplated that all devices that may be onboarded to the network 1200 have a wireless radio that broadcasts and receives at least at the 2.4 GHz band. The signal strength or distance between a SoftAP node and various clients may be relevant to determine which client to onboard first so that the overall distributed bulk onboarding process is most efficient. The process is "distributed" in the sense that the responsibility for onboarding devices to the network is distributed among more devices than just the Wi-Fi router. The process may be efficient in the sense that the onboarding of all the devices saves one or more of time, battery/electrical power, processing resources, and data transmission.

The information received by the smartphone 1202 regarding the devices in the network 1200 may be acquired by various discovery protocols, including those currently known in the art, such as Simple Service Discovery Protocol (SSDP), Link Layer Discovery Protocol (LLDP), Neighbor Discovery Protocol (NDP), Universal Plug-N-Play (UPnP), and other existing and yet-to-be-implemented discovery protocols that allow for network devices to broadcast and/or discover identities, locations, capabilities, and/or services. The discovery or broadcast of each device in a network may be implemented by a logical component such as the discovery/broadcast component 835 of FIG. 8. Through these discovery protocols, the smartphone 1202 can learn which devices on the network 1200 are broadcasting SoftAPs and which devices broadcast only an onboardee interface (e.g., the onboarding client 813, which can receive configuration information but not configure another device itself.).

Based on the information about the devices on the network 1200, the smartphone 1202 can then construct a map of a tree for efficiently onboarding all of the devices. The tree may include all of the nodes and leaves in the network 1200. Throughout this disclosure, the concept of a tree describes a set of information or instructions that specify where devices in a network are in relationship to each other in terms of physical distance and/or signal strength. Additionally the tree information identifies which devices in a potential network broadcast SoftAPs and identifies one or more efficient pathways between all the devices that would result in the onboarding of all the devices. In FIG. 12, the tree would include a set of instructions that identify all the SoftAP nodes. Specifically, in FIG. 12, the nodes broadcasting SoftAPs would be the smartphone 1202, the desktop computer 1203, the IoT device 1204, the IoT device 1205, the tablet computer 1210, and the laptop computer 1211. The tree would also include a set of instructions identifying the leaf client-only devices. The leaf client-only devices would be IoT devices 1206, 1207, 1208, 1209, 1212, 1213, and 1214. In the prior art, each of the devices in the network 1200 may have been onboarded one at a time by the Wi-Fi router 1201, or by some other one-to-many onboarding process. Aspects of the present disclosure allow each of the SoftAP node devices to onboard one or more other devices. For purposes of this illustration, the desktop computer 1203, the tablet computer 1210, the laptop computer 1211, and the smartphone 1202 may all have dual-band wireless (2.4 GHz and 5 GHz) radios, and all the IoT devices 1204, 1205, 1206, 1207, 1208, 1209, 1212, 1213, and 1214 may have single-band (2.4 GHz) wireless radios, even though two of the IoT devices 1204 and 1205 are enabled with a SoftAP.

Once the Wi-Fi router 1201 has onboarded the smartphone 1202 and the tree mapping component 1104 has created a tree indicating what kinds of devices are in the network and where they are located, the smartphone may send instructions back to the Wi-Fi router 1201 that include the map and/or instructions of which device to onboard next. The tree map is alternatively referred to as tree "instructions." The tree map or instructions may comprise various forms, as will be described in further detail throughout the disclosure. An aspect of the disclosure is that when one node onboards another node, the onboarding node provides the tree map or instructions to the onboardee node, so that the onboardee node knows which devices it should onboard itself (that is, the onboardee becomes the onboarder). In the example of FIG. 12, the smartphone 1202 itself may search for the device it should onboard, based on the map and/or instructions. In some embodiments, the result of mapping a tree may be that each onboarding device will receive exact instructions on which other devices to onboard, and in what order. That is, the tree map of all the nodes and leaves may accurately calculate ahead of time the desired order in which to onboard all the devices. For example, the tree map may dictate that the Wi-Fi router 1201 should onboard the desktop computer 1203 first, then the IoT device 1205, then the IoT device 1214, and nothing else. In other embodiments, each onboarding node may instead receive a decision algorithm to follow in order to search out and determine which device it should onboard next. For example, the Wi-Fi router 1201 could receive a decision algorithm that tells it to onboard the nearest node first, but if two or more nodes are the same distance away, to choose the one that has the more robust wireless radio. The decision algorithm could further instruct that if all of the radios are the same, then onboard the one that is closest to the most client-only devices. If there is no way to distinguish between the devices, then randomly select one to onboard. These instructions may be very simple or very complex. Very simple instructions may comprise telling each onboarding node to onboard the nearest node it can find, and then onboard the next nearest node it can find. Once it runs out of nodes to onboard, then onboard the nearest leaf, and repeat until it cannot find any more leaves. Very complex instructions may comprise giving each node a complex decision algorithm that takes into account how far away multiple nodes or clients are, the type of wireless radio each device has, can calculate whether other nodes are better positioned to onboard certain other devices in the network, and can calculate the timeframe in which certain other devices will onboard each other. It is contemplated that there may be tradeoff between the complexity of the instructions and the efficiency of the complete onboarding process.

In FIG. 12, the Wi-Fi router 1201 and the smartphone 1202 each begin to onboard another SoftAP node. In this example, the Wi-Fi router 1201 onboards the desktop computer 1203, and the smartphone 1202 onboards the laptop computer 1211. An advantage to having both the Wi-Fi router 1201 and the smartphone 1202 onboarding different devices is that the onboarding of the two newest devices 1203 and 1211 can take place at the same time. The tree map in this example may have determined that it is more efficient for the smartphone 1202 to onboard the laptop 1211 first, instead of the IoT device 1212, even though the IoT device 1212 is closer. This may be because it is faster to onboard another SoftAP node first, because then that node can turn around and onboard other Soft AP nodes and client-only device leaves. In many embodiments, all the SoftAP nodes may be onboarded first in order to maximize the number of SoftAP onboarding devices, which minimizes the time necessary to onboard all the client-only leaf devices.

Figure 12A:
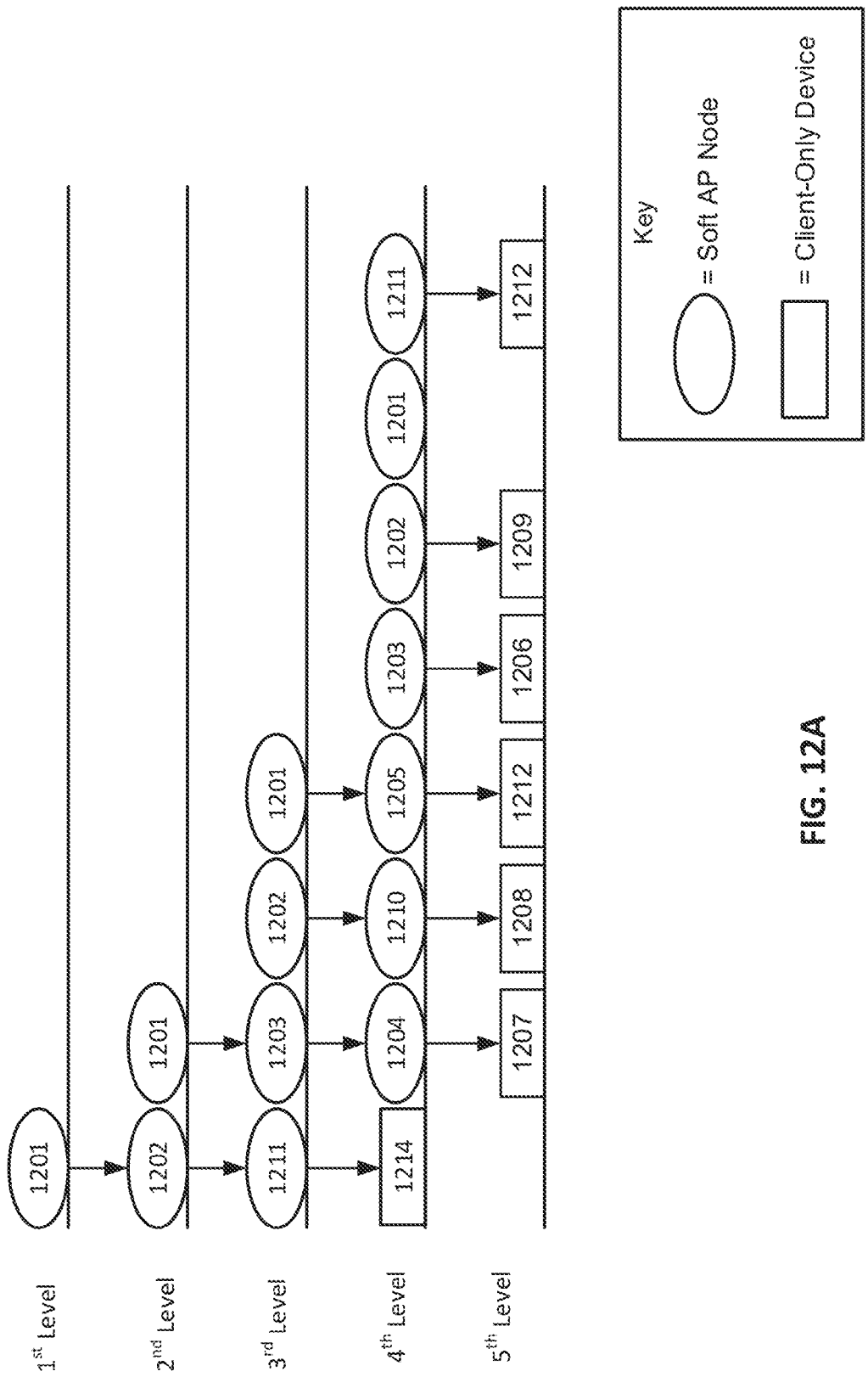
FIG. 12A is a chart that illustrates how the computing devices and IoT devices in FIG. 12 may be onboarded in relation to one another, according to an aspect of the disclosure.

In order to better illustrate the order in which the devices in FIG. 12 may be onboarded, simultaneous reference will be made to the table in FIG. 12A. As stated previously, using conventional means, onboarding wireless devices sometimes takes between 30-60 seconds, though it is contemplated that aspects of this disclosure may still apply to future onboarding protocols requiring less time. Even within the same network, and between similar devices, onboarding times between devices may take varying amounts of time. For the purpose of simplicity, the time it takes to onboard one device will correspond to a "level." As described above, first the Wi-Fi router 1201 onboards the smartphone 1202, as illustrated during the first level of FIG. 12A. At this point there are now two devices, 1202 and 1201, capable of onboarding other devices, as illustrated in the line representing the second level. In FIG. 12A, all devices that may have SoftAPs are designated by an oval. All client-only devices (which cannot onboard other devices) are designated by a rectangle. The smartphone 1202 and Wi-Fi router 1201 then onboard the next SoftAP nodes, which are the laptop computer 1211 and desktop computer, 1203, respectively. Once the laptop computer 1211 and the desktop computer 1203 are onboarded, there are now four total devices that are capable of onboarding other devices, 1211, 1203, 1202 and 1201, listed at the third level 1263.

At the third level 1263, the laptop computer 1211, the desktop computer 1203, the smartphone 1202, and the WiFi router 1201 then onboard the next devices in the network. There are now four onboarding-capable devices, and only three more SoftAP nodes to onboard (IoT Device 1204, tablet computer 1210, and IoT device 1205). According to the tree map in this particular example, it may be highly efficient for the laptop computer 1211 to onboard the IoT device 1214, which is a client-only device. It may also be most efficient for the desktop computer 1203 to onboard the IoT device 1204 (which is a SoftAP node), for the smartphone 1202 to onboard the tablet computer 1210 (which is a SoftAP node), and the Wi-Fi router 1201 to onboard the IoT device 1205 (which is a SoftAP node). At this point, all the SoftAP nodes in the network are onboarded. Also at this point, all of the SoftAP nodes are available to onboard other devices, as listed at the fourth level 1264. Additionally, the fourth level also lists the one client device that has been onboarded so far, which is IoT device 1214.

At the fourth level 1264, there are only client devices left to be onboarded, and there are more than enough SoftAP nodes to onboard each one. According to the tree map in this example, it may be most efficient for the IoT device 1204 to onboard the IoT device 1207, for the tablet computer 1210 to onboard the IoT device 1208, for the IoT device 1205 to onboard the IoT device 1212, for the desktop computer 1203 to onboard the IoT device 1206, for the smartphone 1202 to onboard the IoT device 1209, and for the laptop computer 1211 to onboard the IoT device 1212. The onboarding of these devices is shown at the fifth level 1265. The IoT device 1214 at the fourth level 1263 does not onboard any other device because it does not have a SoftAP, and the Wi-Fi router 1201 at the fourth level 1263 does not onboard any devices because there are no other devices to onboard, and the Wi-Fi router 1201 may have been the least efficient option for onboarding each of the client devices.

In the example described, if the onboarding of each device takes approximately one minute, the onboarding of all the devices may be accomplished within four levels, or four minutes (given that the first device, the Wi-Fi router, is already onboarded to begin with). An advantage to this distributed bulk onboarding method is that all devices can be onboarded more quickly than by having each device onboard through one device such as a Wi-Fi router (e.g., thirteen devices might take thirteen minutes).

As stated earlier, an aspect of the disclosure is that when one device onboards another, the onboarding device provides the SSID, security credentials, some other possible network credentials, as well as the tree information that allows the onboardee device to know which, if any, other devices it must onboard. In some embodiments, the tree information may exist as a complete map of all the devices in the network and may indicate which devices will onboard which other devices, and at which level of stage that onboarding will take place. For example, all the information in FIG. 12a may be distributed to each device with a SoftAP. However, it is contemplated that to save transmission of excess data, sometimes only a partial list of information may be sent to a particular onboarding device. That is, each device may not need to know which devices it is not responsible for onboarding, but rather only the devices that it is responsible for onboarding. For example, in FIG. 12A, the desktop computer 1203 may only need to know that it is responsible for onboarding IoT device 1204 and IoT device 1206; any other tree information may be extraneous. IoT device 1204 may only need to know that it needs to onboard IoT device 1207, and any other tree information may be extraneous. It is contemplated that in some embodiments, only the smartphone 1202 (or other bulk onboarding configuration device) may have the full tree information. In other embodiments, only the device with the bulk onboarding configuration device and the Wi-Fi router 1201 may receive the full tree information, while all other nodes only receive the portion of the tree information that is necessary for it to onboard other devices.

Figure 13:
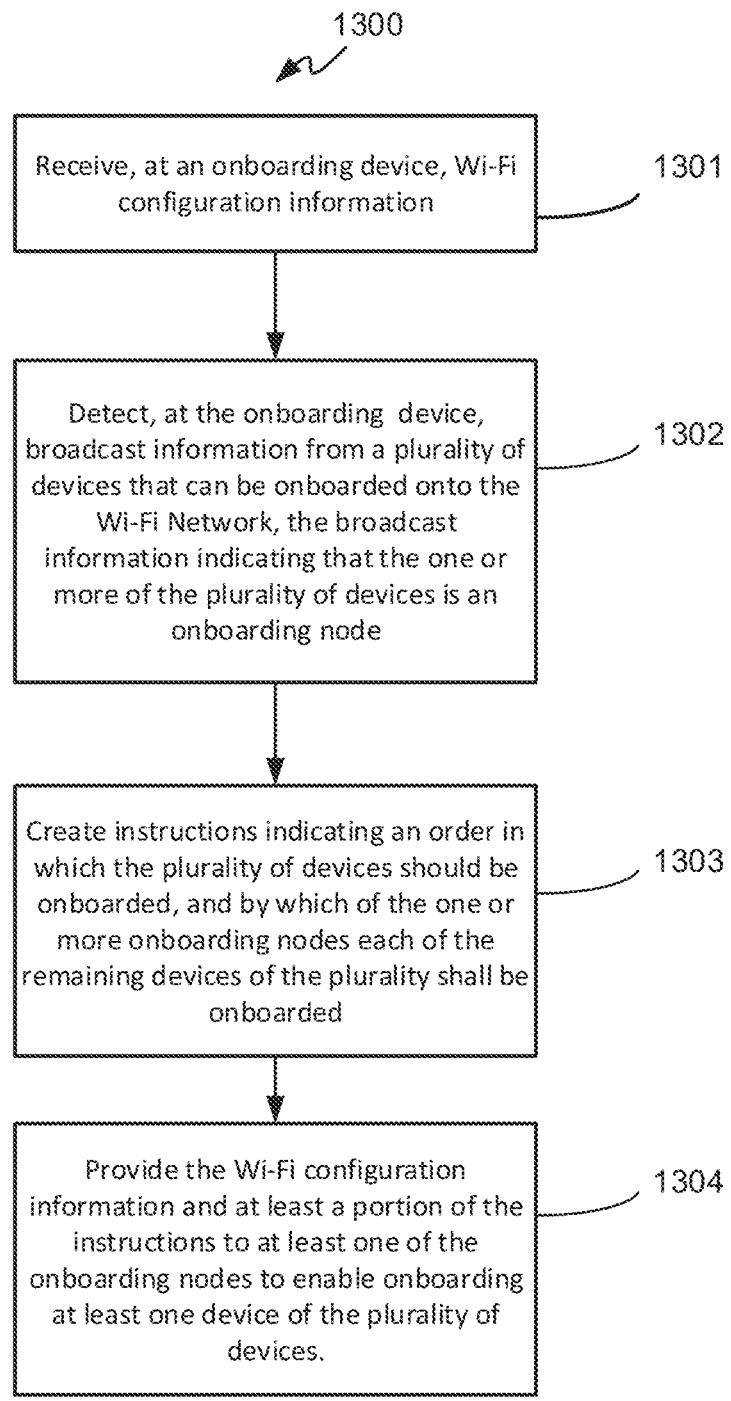
FIG. 13 illustrates a method for bulk onboarding of devices, in accordance with one aspect of the disclosure.

FIG. 13 is a flowchart that may be traversed to execute a method 1300 for distributed bulk onboarding of devices onto a Wi-Fi network in accordance with aspects of the disclosure. Simultaneous reference may be made to FIGS. 8A and 11 to illustrate components that may be used to implement aspects of the method 1300. First, at step 1301, the method 1300 may comprise receiving, at an onboarding device, (e.g., onboarder device 810A), configuration information for a Wi-Fi network. Then at step 1302, the method may include detecting, at the onboarding device, broadcast information from a plurality of other devices that can be onboarded onto the Wi-Fi Network, the broadcast information indicating that the one or more of the plurality of other devices is an onboarding node capable of onboarding another of the plurality of other devices. Next, at step 1303, the method may include creating instructions (e.g., at the tree mapping module 1104) indicating an order in which all of the plurality of devices should be onboarded and by which of the one or more onboarding nodes each of the remaining devices of the plurality shall be onboarded. Finally, at step 1304, the method may include providing the Wi-Fi configuration information (e.g., at the onboarding service 813A) and at least a portion of the instructions to at least one of the onboarding nodes to enable onboarding at least one device of the plurality of devices.

Figure 14:
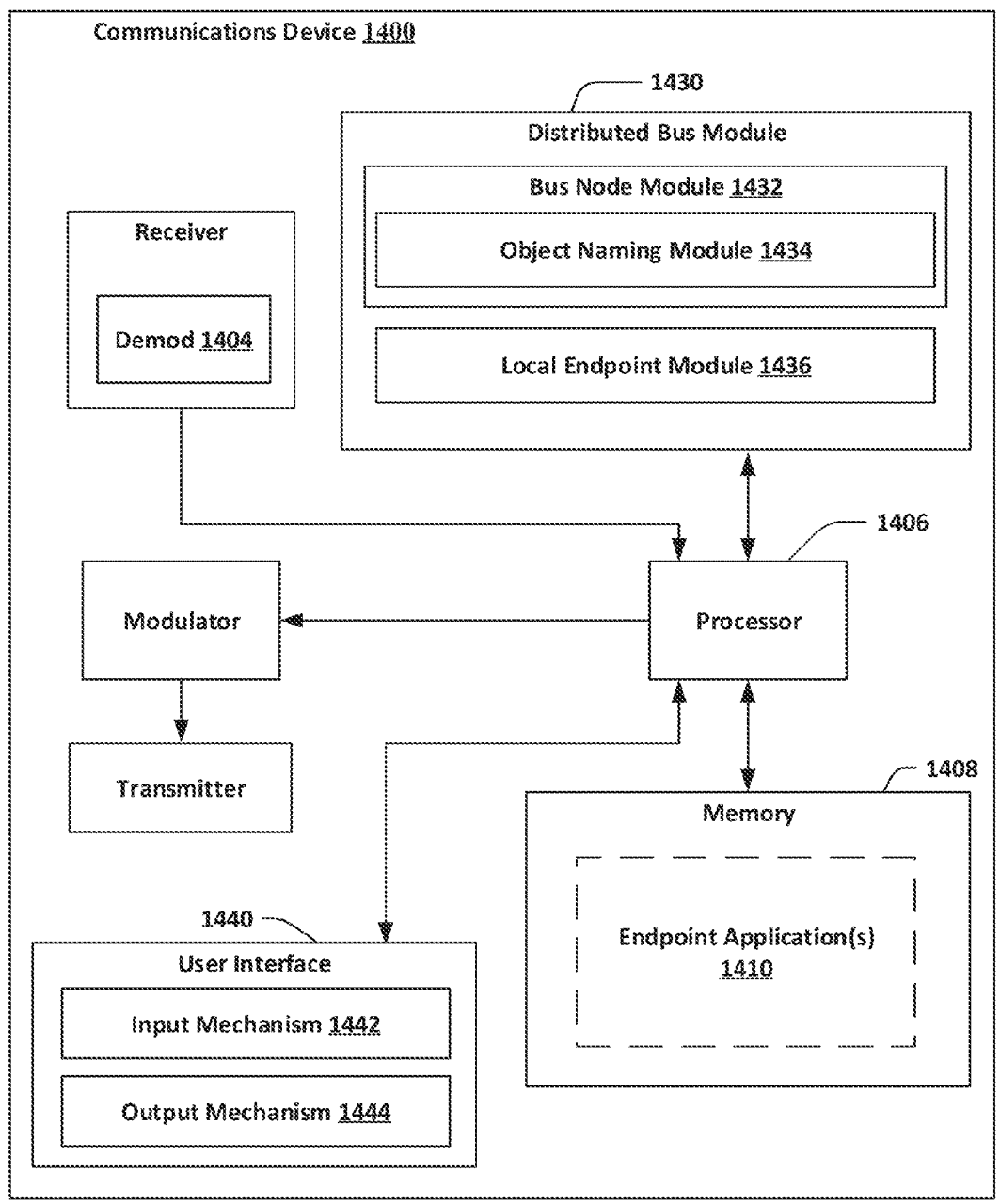
FIG. 14 illustrates an exemplary block diagram corresponding to a device that may be utilized in connection with the embodiments disclosed herein.

According to one aspect of the disclosure, FIG. 14 illustrates an exemplary communications device 1400 that may correspond to one or more devices that may use discoverable P2P services to communicate over a proximity-based distributed bus, as described in further detail above (e.g., an onboarder device, an onboardee device, an onboarded device, etc.). In particular, as shown in FIG. 14, communications device 1400 may comprise a receiver 1402 that may receive a signal from, for instance, a receiver antenna (not shown), perform typical actions on the received signal (e.g., filtering, amplifying, downconverting, etc.), and digitize the conditioned signal to obtain samples. The receiver 1402 can comprise a demodulator 1404 that can demodulate received symbols and provide them to a processor 1406 for channel estimation. The processor 1406 can be a processor dedicated to analyzing information received by the receiver 1402 and/or generating information for transmission by a transmitter 1420, a processor that controls one or more components of communications device 1400, and/or a processor that both analyzes information received by receiver 1402, generates information for transmission by transmitter 1420, and controls one or more components of communications device 1400.

Communications device 1400 can additionally comprise a memory 1408 that is operatively coupled to processor 1406 and that can store data to be transmitted, received data, information related to available channels, data associated with analyzed signal and/or interference strength, information related to an assigned channel, power, rate, or the like, and any other suitable information for estimating a channel and communicating via the channel. In one aspect, the memory 1408 can include local endpoint applications 1410, which may seek to communicate with endpoint applications, services etc., on communications device 1400 and/or other communications devices 1400 associated through distributed bus module 1430. Memory 1408 can additionally store protocols and/or algorithms associated with estimating and/or utilizing a channel (e.g., performance based, capacity based, etc.).

It will be appreciated that data store (e.g., memory 1408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1408 of the subject systems and methods may comprise, without being limited to, these and any other suitable types of memory.

Communications device 1400 can further include distributed bus module 1430 to facilitate establishing connections with other devices, such as communications device 1400. Distributed bus module 1430 may further comprise bus node module 1432 to assist distributed bus module 1430 managing communications between multiple devices. In one aspect, a bus node module 1432 may further include object naming module 1434 to assist bus node module 1432 in communicating with endpoint applications 1410 associated with other devices. Still further, distributed bus module 1430 may include endpoint module 1436 to assist local endpoints in communicating with other local endpoints and/or endpoints accessible on other devices through an established distributed bus. In another aspect, distributed bus module 1430 may facilitate inter-device and/or intra-device communications over multiple available transports (e.g., Bluetooth, UNIX domain-sockets, TCP/IP, Wi-Fi, etc.).

Additionally, in one embodiment, communications device 1400 may include a user interface 1440, which may include one or more input mechanisms 1442 for generating inputs into communications device 1400, and one or more output mechanisms 1444 for generating information for consumption by the user of the communications device 1400. For example, input mechanism 1442 may include a mechanism such as a key or keyboard, a mouse, a touch-screen display, a microphone, etc. Further, for example, output mechanism 1444 may include a display, an audio speaker, a haptic feedback mechanism, a Personal Area Network (PAN) transceiver etc. In the illustrated aspects, the output mechanism 1444 may include an audio speaker operable to render media content in an audio form, a display operable to render media content in an image or video format and/or timed metadata in a textual or visual form, or other suitable output mechanisms. However, in one embodiment, a headless communications device 1400 may not include certain input mechanisms 1442 and/or output mechanisms 1444 because headless devices generally refer to computer systems or device that have been configured to operate without a monitor, keyboard, and/or mouse.

Additional details that relate to the aspects and embodiments disclosed herein are described and illustrated in the Appendices attached hereto, the contents of which are expressly incorporated herein by reference in their entirety as part of this disclosure.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for distributed bulk onboarding of devices onto a Wi-Fi network, the method comprising:
    receiving, at an onboarding device, Wi-Fi configuration information,
    detecting, at the onboarding device, broadcast information from a plurality of devices that may be onboarded onto the Wi-Fi network, the broadcast information indicating that one or more of the plurality of devices is an onboarding node capable of onboarding another of the plurality of devices,
    creating instructions indicating an order in which the plurality of devices may be onboarded, and by which of the one or more onboarding nodes each of the remaining devices of the plurality shall be onboarded, and
    providing Wi-Fi configuration information and at least a portion of the instructions to at least one of the onboarding nodes to enable onboarding at least one device of the plurality of devices.

2. The method of claim 1, wherein the broadcast information includes that one or more of the onboarding nodes comprises a software-enabled access point.

3. The method of claim 1, wherein the Wi-Fi configuration information includes one or more of:
    an SSID, a password, and an encryption setting.

4. The method of claim 1, wherein the instructions comprises an algorithm for allowing an onboarding node to determine which of the plurality of devices to onboard.

5. The method of claim 1, wherein the instructions include instructions for a first onboarding node that receives at least a portion of the instructions to provide the Wi-Fi configuration information and at least a portion of the instructions to a second onboarding node.

6. The method of claim 1, wherein receiving the Wi-Fi configuration information includes receiving at least a portion of the Wi-Fi configuration information from a user through a user interface on the onboarding device.

7. A system for distributed bulk onboarding of a plurality of communication devices onto a Wi-Fi network, the system comprising:
    three or more communication devices, a first one of the communication devices is a bulk onboarding configuration device and at least one second one of the other communication devices is an onboarding node capable of onboarding at least a third one of the communication devices, wherein;
    the bulk onboarding communication device is adapted to:
        receive Wi-Fi configuration information,
        detect broadcast information from the plurality of communication devices that can be onboarded onto the Wi-Fi network,
        create instructions that indicate an order in which the plurality of communication devices should be onboarded;
    the onboarding node is adapted to:
        receive the Wi-Fi configuration information from the bulk onboarding communication device,
        connect to the Wi-Fi network,
        receive at least a portion of the instructions, the portion of the instructions instructing the node to provide the Wi-Fi configuration information to the third one of the communication devices; and
    the third one of the communication devices is adapted to:
        receive the Wi-Fi configuration information and connect to the Wi-Fi network using the Wi-Fi configuration information.

8. The system of claim 7, wherein the onboarding node comprises a software-enabled access point.

9. The system of claim 7, wherein the Wi-Fi configuration information includes one or more of:
an SSID, a password, or an encryption setting.

10. The system of claim 7, wherein the instructions comprise an algorithm for allowing the onboarding node to determine which of the plurality of devices to onboard.

11. The system of claim 7, wherein the third communication device is a second onboarding node and further comprising a fourth communication device, and
the onboarding node is a first onboarding node and provides at least a portion of the instructions to the second onboarding node, and
the second node onboarding provides the Wi-Fi configuration information for the fourth communication device, and
the fourth communication device receives the Wi-Fi configuration information and connects to the Wi-Fi network.

12. The system of claim 7, wherein the bulk onboarding configuration device comprises a user interface for accepting at least a portion of the W-Fi configuration information from a user.

13. A non-transitory, tangible processor readable storage medium, encoded with processor readable instructions to perform a method for distributed bulk onboarding of devices onto a Wi-Fi network, the method comprising:
receiving, at an onboarding device, Wi-Fi configuration information,
detecting, at the onboarding device, broadcast information from a plurality of devices that may be onboarded onto the Wi-Fi network, the broadcast information indicating that one or more of the plurality of devices is an onboarding node capable of onboarding another of the plurality of devices,
creating instructions indicating an order in which the plurality of devices may be onboarded, and by which of the one or more onboarding nodes each of the remaining devices of the plurality shall be onboarded, and
providing Wi-Fi configuration information and at least a portion of the instructions to at least one of the onboarding nodes to enable onboarding at least one device of the plurality of devices.

14. The non-transitory, tangible processor readable storage medium of claim 13, wherein the broadcast information includes that one or more of the onboarding nodes comprises a software-enabled access point.

15. The non-transitory, tangible processor readable storage medium of claim 13, wherein the Wi-Fi configuration information includes one or more of:
an SSID, a password, and an encryption setting.

16. The non-transitory, tangible processor readable storage medium of claim 13, wherein the instructions comprise an algorithm for allowing the onboarding node to determine which of the plurality of devices to onboard.

17. The non-transitory, tangible processor readable storage medium of claim 13, wherein the instructions include instructions for a first onboarding node that receives at least a portion of the instructions to provide the Wi-Fi configuration information and at least a portion of the instructions to a second node.

18. The non-transitory, tangible processor readable storage medium of claim 13, wherein receiving the Wi-Fi configuration information includes receiving at least a portion of the Wi-Fi configuration information from a user through a user interface on the onboarding device.

* * * * *